United States Patent
Vitthaladevuni et al.

(10) Patent No.: US 8,599,763 B2
(45) Date of Patent: Dec. 3, 2013

(54) TIMING CONTROL IN A MULTI-POINT HIGH SPEED DOWNLINK PACKET ACCESS NETWORK

(75) Inventors: Pavan Kumar Vitthaladevuni, San Diego, CA (US); Haitong Sun, San Diego, CA (US); Danlu Zhang, San Diego, CA (US); Sharad Deepak Sambhwani, San Diego, CA (US); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 13/209,361

(22) Filed: Aug. 12, 2011

(65) Prior Publication Data

US 2012/0069798 A1    Mar. 22, 2012

Related U.S. Application Data

(60) Provisional application No. 61/374,201, filed on Aug. 16, 2010, provisional application No. 61/431,189, filed on Jan. 10, 2011, provisional application No. 61/481,662, filed on May 2, 2011.

(51) Int. Cl.
 *H04W 4/00* (2009.01)
(52) U.S. Cl.
 USPC ............................. 370/328; 455/450; 455/451
(58) Field of Classification Search
 USPC .................................. 370/328; 455/450, 451
 See application file for complete search history.

(56) References Cited

U.S. PATENT DOCUMENTS

| | | | |
|---|---|---|---|
| 7,164,914 B2 | 1/2007 | Moulsley et al. | |
| 2010/0232382 A1 | 9/2010 | Gauvreau et al. | |
| 2010/0322291 A1 | 12/2010 | Kaikkonen et al. | |
| 2011/0002276 A1 | 1/2011 | Chen et al. | |
| 2011/0300856 A1* | 12/2011 | Aminaka | 455/422.1 |
| 2012/0147856 A1* | 6/2012 | Kazmi et al. | 370/332 |

OTHER PUBLICATIONS

International Search Report and Written Opinion—PCT/US2011/047978—ISA/EPO—Nov. 9, 2011.
Qualcomm Inc.: "Introduction to 4C-HSDPA", 3GPP TSG RAN WG1 Meeting 61-bis, Jul. 5, 2010, pp. 78-82, XP002662304, Retrieved from the Internet: URL:http://www.3gpp.org/ftp/tsgran/WG1_RL1/TSGRI_61b/Docs/ [retrieved on Oct. 27, 2011].

(Continued)

*Primary Examiner* — Albert T Chou
(74) *Attorney, Agent, or Firm* — Darren M. Simon

(57) ABSTRACT

A method, apparatus, processing system, and computer program product enable association of mis-aligned subframes from a first and second downlink with one another, such that a HARQ acknowledgment message including jointly encoded feedback for the respective subframes can be correctly interpreted by the corresponding cells. Here, an RNC may provide an RRC message to the UE to associate particular subframes with one another. Further, the RNC may provide NBAP messages to the cells transmitting the downlink signals, so that the cells can associate the HARQ acknowledgment message with the appropriate subframe. Still further, additional signaling provides for changing the set of associated subframes when needed due to a drift in the timing offset between cells.

48 Claims, 14 Drawing Sheets

(56) References Cited

OTHER PUBLICATIONS

Qualcomm Incorporated: "On deploying DC-HSDPA UEs in Single Frequency Networks", R1-104157, 3rd Generation Partnership Project (3GPP), Mobile Competence Centre ; 650, Route Des Lucioles ; F-06921 Sophia-Antipolis Cedex ; France, vol. RAN-WG1, no. Dresden, Germany; 20100629 Jul. 5, 2010, XP002633072, Retrieved from the Internet: URL:http://www.3gpp.org/ftp/tsg_ran/WG1_RL1/TSGR1_61b/Docs/R1-104157.zip [retrieved on Apr. 14, 2011].

Author N/A (Sep. 2010), UE procedure for reporting ACK/NACK, 3rd Generation Partnership project, 3GPP TS 36.213 V9.3.0, Release 9, chapter 7.3, 51-54.

Motorola (Jul. 2010), TD-LTE: Exciting Alternative, Global Momentum, white paper, Motorola, pp. 1-12, Motorola.com.

* cited by examiner

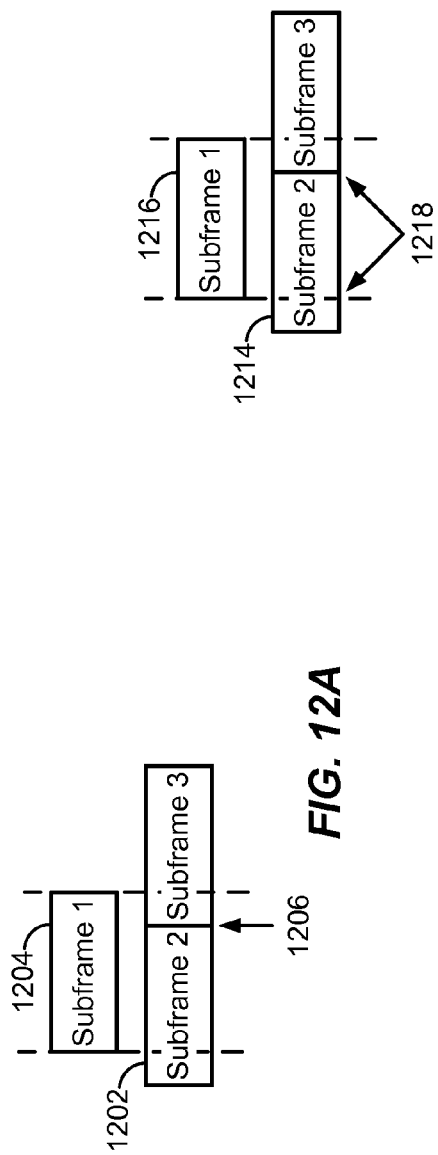
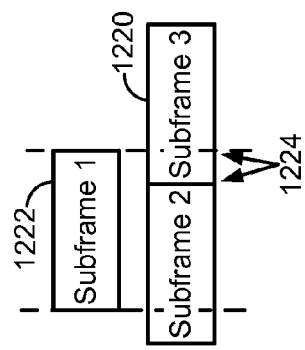
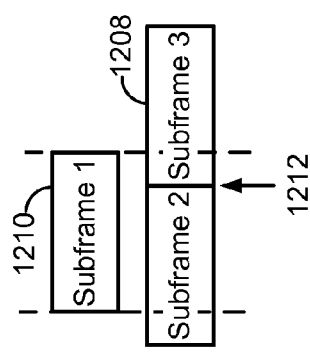
FIG. 12A
FIG. 12B
FIG. 12C
FIG. 12D

TIMING CONTROL IN A MULTI-POINT HIGH SPEED DOWNLINK PACKET ACCESS NETWORK

CROSS-REFERENCE TO RELATED APPLICATIONS

The present application claims the benefit of priority from U.S. Provisional Patent Application Ser. No. 61/374,201, entitled "TIMING CONTROL IN A DOWNLINK COORDINATED MULTI-POINT HIGH SPEED PACKET ACCESS NETWORK," filed on Aug. 16, 2010, U.S. Provisional Application Ser. No. 61/431,189, entitled "TIMING CONTROL IN A DOWNLINK COORDINATED MULTI-POINT HIGH SPEED PACKET ACCESS NETWORK," filed on Jan. 10, 2011 and U.S. Provisional Application Ser. No. 61/481,662, entitled "TIMING CONTROL IN A DOWNLINK COORDINATED MULTI-POINT HIGH SPEED PACKET ACCESS NETWORK," filed on May 2, 2011, all of which are hereby incorporated by reference in their entirety.

BACKGROUND

1. Field

Aspects of the present disclosure relate generally to wireless communication systems, and more particularly, to timing control for feedback messages corresponding to downlink data signals in multi-cell wireless networks.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

One such advancement in UMTS expands high-speed downlink packet access (HSDPA) technology to provide a high-speed downlink channel from each of a plurality of cells, in the same carrier frequency. This system may be referred to as single-frequency dual-cell (SFDC)-HSDPA, or Multipoint HSDPA. Because the SFDC-HSDPA system is newly introduced and the standardization process is ongoing, a number of issues are arising and many solutions are being proposed to address these issues.

SUMMARY

In various aspects, the present disclosure provides a method, apparatus, processing system, and computer program product for associating mis-aligned sub frames from a first and second downlink with one another, such that a joint HARQ acknowledgment message for the respective subframes can be correctly interpreted by the corresponding cells. Here, an RRC message may be provided to the UE to associate particular subframes with one another, and NBAP messages can be provided to the cells transmitting the downlink signals, so that the cells can associate the HARQ acknowledgment message with the appropriate subframe. Further, additional signaling provides for changing the set of associated subframes when needed due to a drift in the timing offset between cells.

In an aspect of the present disclosure, a method of wireless communication includes receiving a first downlink from a first cell, receiving a second downlink from a second cell, receiving an indication to associate a first subframe of the first downlink with a second subframe of the second downlink to construct a set, and transmitting in a single subframe a HARQ acknowledgment message corresponding to the set.

In another aspect of the present disclosure, a method of wireless communication includes receiving a first downlink from a first cell, receiving a second downlink from a second cell, determining an association of a first subframe of the first downlink with a second subframe of the second downlink in accordance with a predetermined alignment rule, and transmitting in a single subframe a HARQ acknowledgment message including information corresponding to the first subframe and the second subframe.

In yet another aspect of the present disclosure, a method of wireless communication includes transmitting to a UE a downlink including a first subframe, receiving from the UE a HARQ acknowledgment message, and receiving from an RNC an indication to associate the HARQ acknowledgment message with the first subframe.

In still another aspect of the present disclosure, a method of wireless communication includes transmitting to a UE a downlink including one or more subframes, receiving from the UE one or more HARQ acknowledgment messages corresponding to the one or more subframes, and receiving from an RNC a timing relationship between the one or more subframes and the one or more corresponding HARQ acknowledgment messages.

In still another aspect of the present disclosure, an apparatus for wireless communication includes means for receiving a first downlink from a first cell, means for receiving a second downlink from a second cell, means for receiving an indication to associate a first subframe of the first downlink with a second subframe of the second downlink to construct a set, and means for transmitting in a single subframe a HARQ acknowledgment message corresponding to the set.

In still another aspect of the present disclosure, an apparatus for wireless communication includes means for receiving a first downlink from a first cell, means for receiving a second downlink from a second cell, means for determining an association of a first subframe of the first downlink with a second subframe of the second downlink in accordance with a predetermined alignment rule, and means for transmitting in a single subframe a HARQ acknowledgment message including information corresponding to the first subframe and the second subframe.

In still another aspect of the present disclosure, an apparatus for wireless communication includes means for transmitting to a UE a downlink including a first subframe, means for receiving from the UE a HARQ acknowledgment message, and means for receiving from an RNC an indication to associate the HARQ acknowledgment message with the first subframe.

In still another aspect of the present disclosure, an apparatus for wireless communication includes means for transmitting to a UE a downlink including one or more subframes, means for receiving from the UE one or more HARQ acknowledgment messages corresponding to the one or more subframes, and means for receiving from an RNC a timing relationship between the one or more subframes and the one or more corresponding HARQ acknowledgment messages.

In still another aspect of the present disclosure, a computer program product includes a computer-readable medium having instructions for causing a computer to receive a first downlink from a first cell, instructions for causing a computer to receive a second downlink from a second cell, instructions for causing a computer to receive an indication to associate a first subframe of the first downlink with a second subframe of the second downlink to construct a set, and instructions for causing a computer to transmit in a single subframe a HARQ acknowledgment message corresponding to the set.

In still another aspect of the present disclosure, a computer program product includes a computer-readable medium having instructions for causing a computer to receive a first downlink from a first cell, instructions for causing a computer to receive a second downlink from a second cell, instructions for causing a computer to determine an association of a first subframe of the first downlink with a second subframe of the second downlink in accordance with a predetermined alignment rule, and instructions for causing a computer to transmit in a single subframe a HARQ acknowledgment message including information corresponding to the first subframe and the second subframe.

In still another aspect of the present disclosure, a computer program product includes a computer-readable medium having instructions for causing a computer to transmit to a UE a downlink including a first subframe, instructions for causing a computer to receive from the UE a HARQ acknowledgment message, and instructions for causing a computer to receive from an RNC an indication to associate the HARQ acknowledgment message with the first subframe.

In still another aspect of the present disclosure, a computer program product includes a computer-readable medium having instructions for causing a computer to transmit to a UE a downlink including one or more subframes, instructions for causing a computer to receive from the UE one or more HARQ acknowledgment messages corresponding to the one or more subframes, and instructions for causing a computer to receive from an RNC a timing relationship between the one or more subframes and the one or more corresponding HARQ acknowledgment messages.

In still another aspect of the present disclosure, a processing system includes at least one processor and a memory coupled to the at least one processor, wherein the at least one processor is configured to receive a first downlink from a first cell, to receive a second downlink from a second cell, to receive an indication to associate a first subframe of the first downlink with a second subframe of the second downlink to construct a set, and to transmit in a single subframe a HARQ acknowledgment message corresponding to the set.

In still another aspect of the present disclosure, a processing system includes at least one processor and a memory coupled to the at least one processor, wherein the at least one processor is configured to receive a first downlink from a first cell, to receive a second downlink from a second cell, to determine an association of a first subframe of the first downlink with a second subframe of the second downlink in accordance with a predetermined alignment rule, and to transmit in a single subframe a HARQ acknowledgment message including information corresponding to the first subframe and the second subframe.

In still another aspect of the present disclosure, a processing system includes at least one processor and a memory coupled to the at least one processor, wherein the at least one processor is configured to transmit to a UE a downlink including a first subframe, to receive from the UE a HARQ acknowledgment message, and to receive from an RNC an indication to associate the HARQ acknowledgment message with the first subframe.

In still another aspect of the present disclosure, a processing system includes at least one processor and a memory coupled to the at least one processor, wherein the at least one processor is configured to transmit to a UE a downlink including one or more subframes, to receive from the UE one or more HARQ acknowledgment messages corresponding to the one or more subframes, and to receive from an RNC a timing relationship between the one or more subframes and the one or more corresponding HARQ acknowledgment messages.

These and other aspects of the invention will become more fully understood upon a review of the detailed description, which follows.

BRIEF DESCRIPTION OF THE DRAWINGS

FIG. 12A-12D are timing diagrams illustrating various alignment rules for hard-coding an association between mis-aligned subframes.

DETAILED DESCRIPTION

Figure 1:
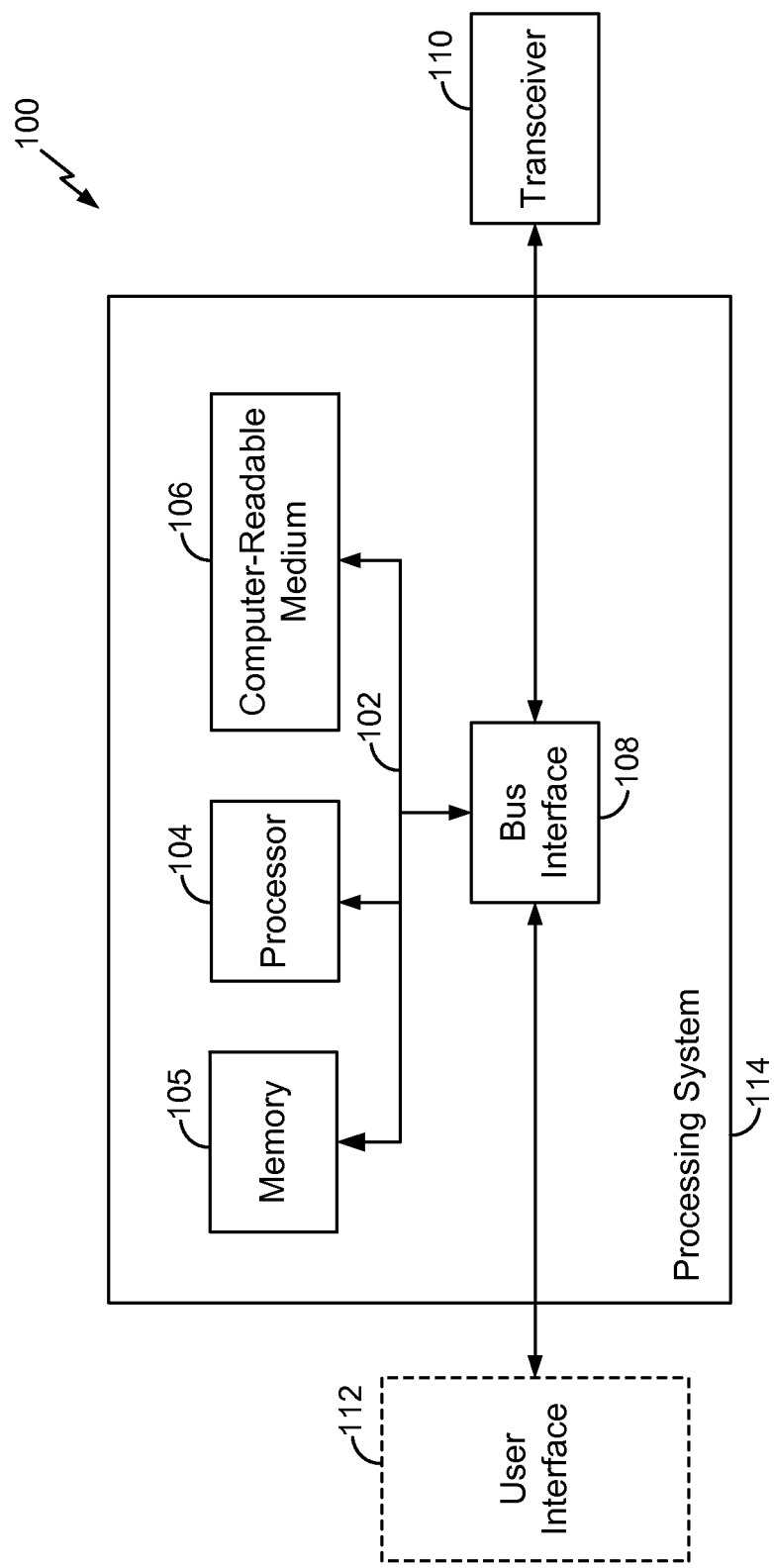
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, a memory 105, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
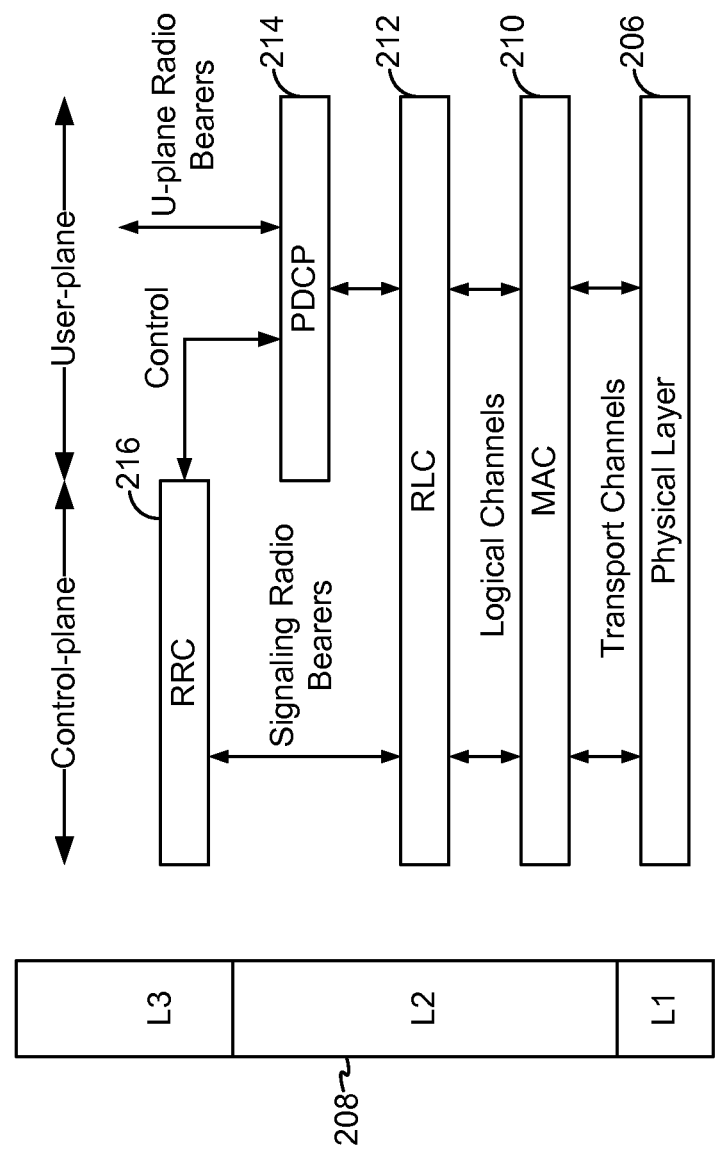
FIG. 2 is a conceptual diagram illustrating an example of a radio protocol architecture for the user and control plane.

In a wireless telecommunication system, the radio protocol architecture between a mobile device and a cellular network may take on various forms depending on the particular application. An example for a 3GPP high-speed packet access (HSPA) system will now be presented with reference to FIG. 2, illustrating an example of the radio protocol architecture for the user and control planes between user equipment (UE) and a base station, commonly referred to as a Node B. Here, the user plane or data plane carries user traffic, while the control plane carries control information, i.e., signaling.

Turning to FIG. 2, the radio protocol architecture for the UE and Node B is shown with three layers: Layer 1, Layer 2, and Layer 3. Layer 1 is the lowest layer and implements various physical layer signal processing functions. Layer 1 will be referred to herein as the physical layer 206. The data link layer, called Layer 2 (L2 layer) 208 is above the physical layer 206 and is responsible for the link between the UE and Node B over the physical layer 206.

At Layer 3, the RRC layer 216 handles the control plane signaling between the UE and the Node B. RRC layer 216 includes a number of functional entities for routing higher layer messages, handling broadcast and paging functions, establishing and configuring radio bearers, etc.

In the illustrated air interface, in the control plane the L2 layer 208 includes two sublayers: a medium access control (MAC) sublayer 210 and a radio link control (RLC) sublayer 212. In the user plane, the L2 layer 208 additionally includes a packet data convergence protocol (PDCP) sublayer 214. Although not shown, the UE may have several upper layers above the L2 layer 208 including a network layer (e.g., IP layer) that is terminated at a PDN gateway on the network side, and an application layer that is terminated at the other end of the connection (e.g., far end UE, server, etc.).

The PDCP sublayer 214 provides multiplexing between different radio bearers and logical channels. The PDCP sublayer 214 also provides header compression for upper layer data packets to reduce radio transmission overhead, security by ciphering the data packets, and handover support for UEs between Node Bs.

The RLC sublayer 212 provides segmentation and reassembly of upper layer data packets, retransmission of lost data packets, and reordering of data packets to compensate for out-of-order reception due to a hybrid automatic repeat request (HARQ).

The MAC sublayer 210 provides multiplexing between logical and transport channels. The MAC sublayer 210 is also responsible for allocating the various radio resources (e.g., resource blocks) in one cell among the UEs. The MAC sublayer 210 is also responsible for HARQ operations.

Figure 3:
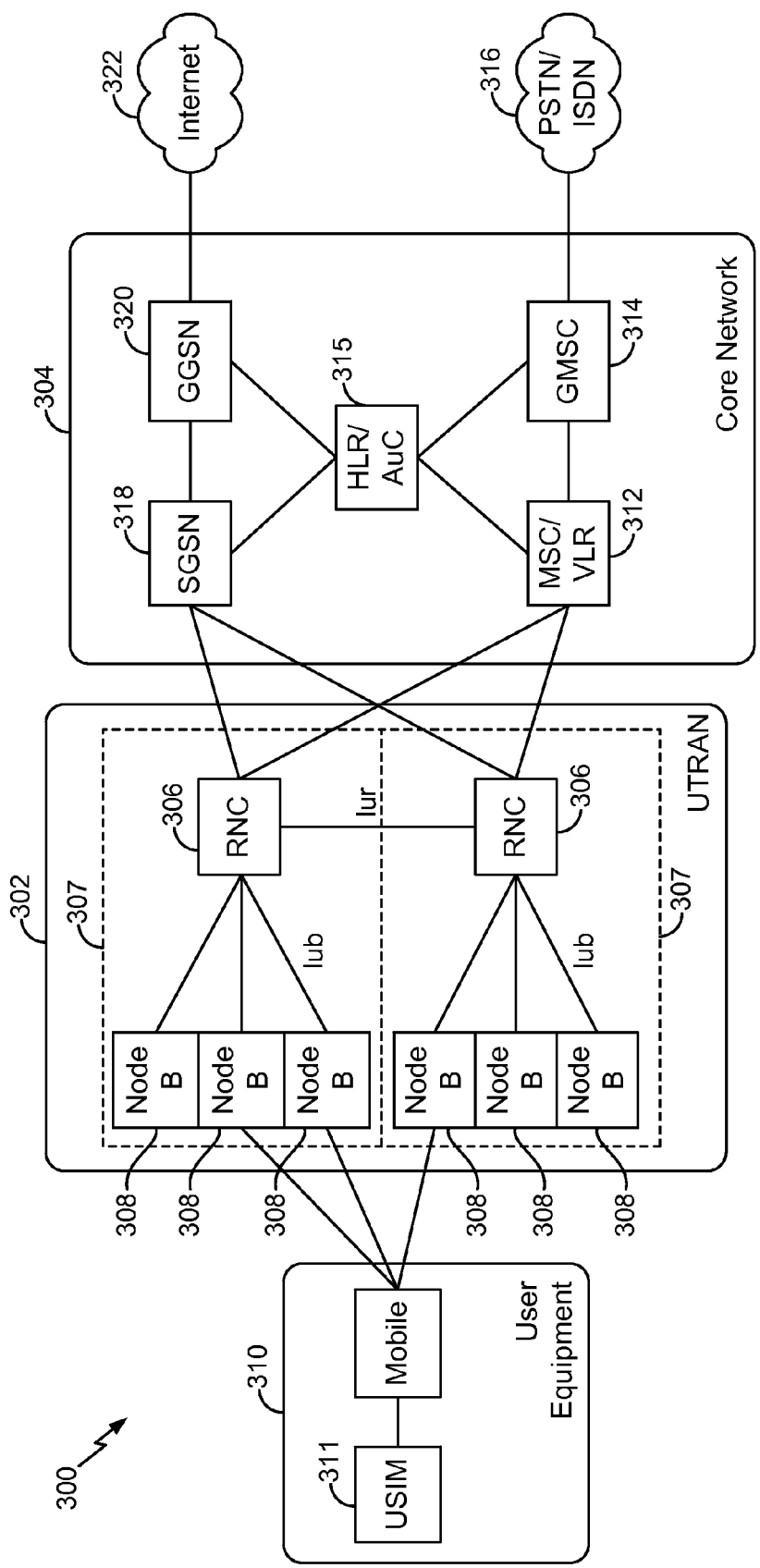
FIG. 3 is a block diagram conceptually illustrating an example of a telecommunications system.

The various concepts presented throughout this disclosure may be implemented across a broad variety of telecommunication systems, network architectures, and communication standards. Referring now to FIG. 3, by way of example and without limitation, various aspects of the present disclosure are illustrated with reference to a Universal Mobile Telecommunications System (UMTS) system 300 employing a W-CDMA air interface. A UMTS network includes three interacting domains: a Core Network (CN) 304, a UMTS Terrestrial Radio Access Network (UTRAN) 302, and User Equipment (UE) 310. In this example, the UTRAN 302 may provide various wireless services including telephony, video, data, messaging, broadcasts, and/or other services. The UTRAN 302 may include a plurality of Radio Network Subsystems (RNSs) such as an RNS 307, each controlled by a respective Radio Network Controller (RNC) such as an RNC 306. Here, the UTRAN 302 may include any number of RNCs 306 and RNSs 307 in addition to the illustrated RNCs 306 and RNSs 307. The RNC 306 is an apparatus responsible for, among other things, assigning, reconfiguring and releasing radio resources within the RNS 307. The RNC 306 may be interconnected to other RNCs (not shown) in the UTRAN 302 through various types of interfaces such as a direct physical connection, a virtual network, or the like, using any suitable transport network.

The geographic region covered by the RNS 307 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 308 are shown in each RNS 307; however, the RNSs 307 may include any number of wireless Node Bs. The Node Bs 308 provide wireless access points to a core network (CN) 304 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 310 may further include a universal subscriber identity module (USIM) 311, which contains a user's subscription information to a network. For illustrative purposes, one UE 310 is shown in communication with a number of the Node Bs 308. In a given network, each of the links between a UE 310 and a respective Node B 308 may utilize one or more carriers. Further, the UE 310 may be linked to a plurality of the Node Bs 308 in a soft handover or in soft aggregation. The downlink (DL), also called the forward link, refers to the communication link from a Node B 308 to a UE 310, and the uplink (UL), also called the reverse link, refers to the communication link from a UE 310 to a Node B 308.

Communication over an air interface between a UE 310 and a Node B 308 may utilize the UMTS radio protocol architecture described above and illustrated in FIG. 2. Alternately, the air interface between the UE 310 and the Node B 308 may utilize any suitable protocol.

The core network 304 interfaces with one or more access networks, such as the UTRAN 302. As shown, the core network 304 is a GSM core network. However, as those skilled in the art will recognize, the various concepts presented throughout this disclosure may be implemented in a RAN, or other suitable access network, to provide UEs with access to types of core networks other than GSM networks.

The illustrated GSM core network 304 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains.

In the illustrated example, the core network 304 supports circuit-switched services with a MSC 312 and a GMSC 314. In some applications, the GMSC 314 may be referred to as a media gateway (MGW). One or more RNCs, such as the RNC 306, may be connected to the MSC 312. The MSC 312 is an apparatus that controls call setup, call routing, and UE mobility functions. The MSC 312 also includes a visitor location register (VLR) that contains subscriber-related information for the duration that a UE is in the coverage area of the MSC 312. The GMSC 314 provides a gateway through the MSC 312 for the UE to access a circuit-switched network 316. The GMSC 314 includes a home location register (HLR) 315 containing subscriber data, such as the data reflecting the details of the services to which a particular user has subscribed. The HLR is also associated with an authentication center (AuC) that contains subscriber-specific authentication data. When a call is received for a particular UE, the GMSC 314 queries the HLR 315 to determine the UE's location and forwards the call to the particular MSC serving that location.

The illustrated core network 304 also supports packet-data services with a serving GPRS support node (SGSN) 318 and a gateway GPRS support node (GGSN) 320. GPRS, which stands for General Packet Radio Service, is designed to provide packet-data services at speeds higher than those available with standard circuit-switched data services. The GGSN 320 provides a connection for the UTRAN 302 to a packet-based network 322. The packet-based network 322 may be the Internet, a private data network, or some other suitable packet-based network. The primary function of the GGSN 320 is to provide the UEs 310 with packet-based network connectivity. Data packets may be transferred between the GGSN 320 and the UEs 310 through the SGSN 318, which performs primarily the same functions in the packet-based domain as the MSC 312 performs in the circuit-switched domain.

The UMTS air interface may be a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 308 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

Figure 4:
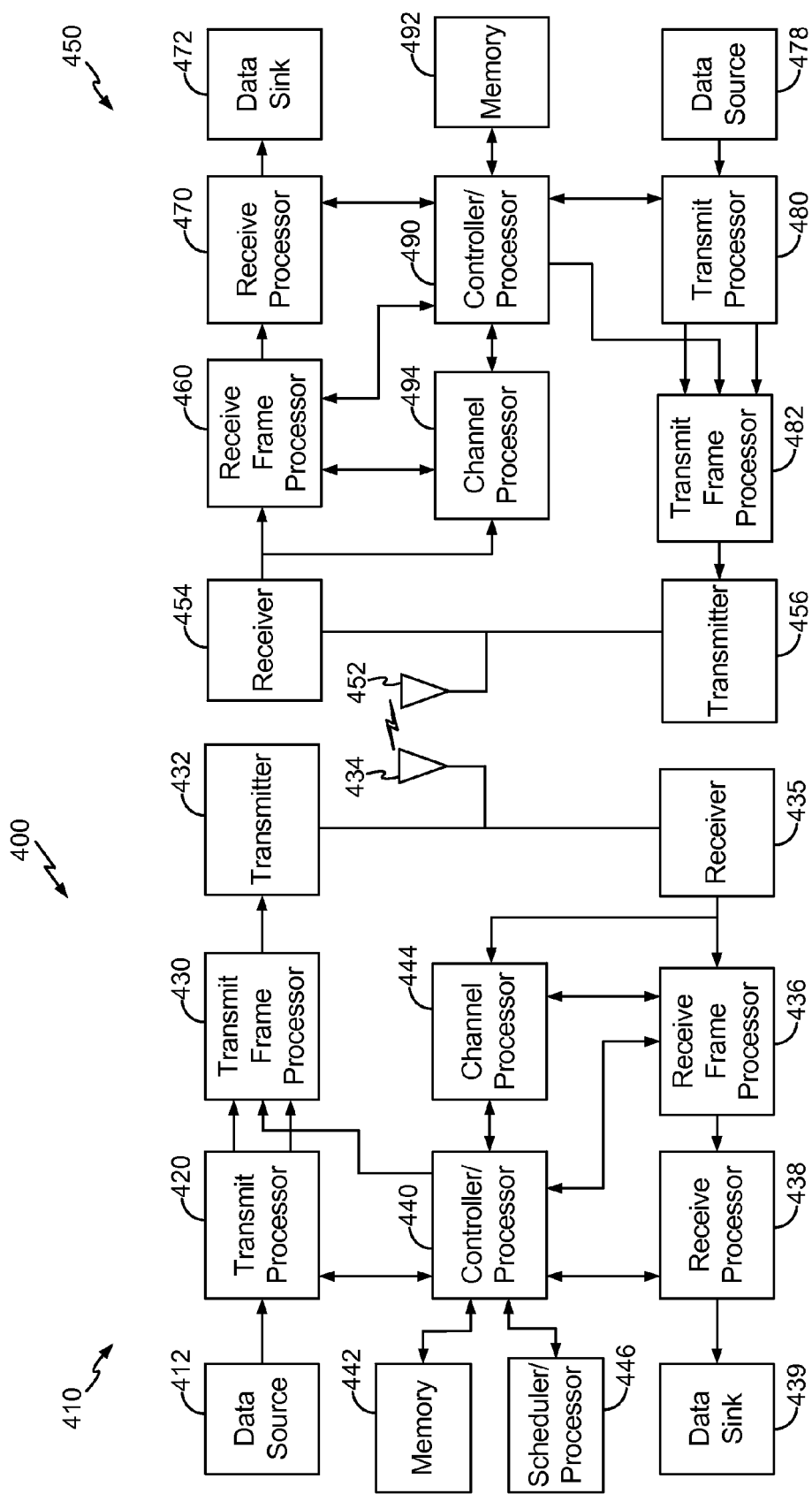
FIG. 4 is a block diagram conceptually illustrating an example of a Node B in communication with a UE in a telecommunications system.

FIG. 4 is a block diagram of an exemplary Node B 410 in communication with an exemplary UE 450, where the Node B 410 may be the Node B 308 in FIG. 3, and the UE 450 may be the UE 310 in FIG. 3. In the downlink direction, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

A high speed packet access (HSPA) air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

Figure 5:
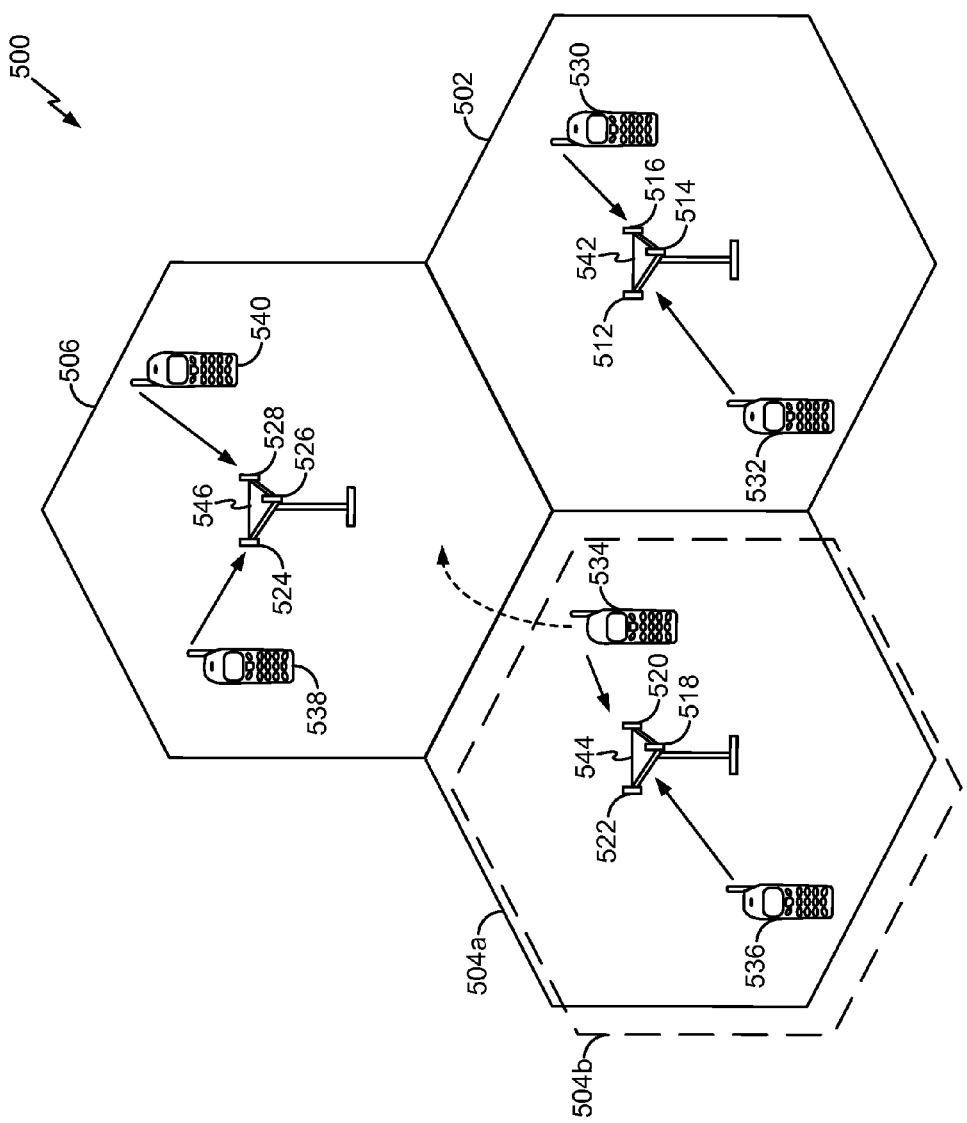
FIG. 5 is a conceptual diagram illustrating an example of an access network.

Referring now to FIG. 5, by way of example and without limitation, a simplified access network 500 in a UTRAN architecture, which may utilize HSPA, is illustrated. The system includes multiple cellular regions (cells), including cells 502, 504, and 506, each of which may include one or more sectors. Cells may be defined geographically, e.g., by coverage area, and/or may be defined in accordance with a frequency, scrambling code, etc. That is, the illustrated geographically-defined cells 502, 504, and 506 may each be further divided into a plurality of cells, e.g., by utilizing different scrambling codes or different carrier frequencies. For example, cell 504a may utilize a first scrambling code, and cell 504b, while in the same geographic region and served by the same Node B 544, may be distinguished by utilizing a second scrambling code. In another example, cell 504a may utilize a first carrier frequency, and cell 504b, while in the same geographic region and served by the same Node B 544, may be distinguished by utilizing a second carrier frequency, which may be in the same band or in a different band than that of the first carrier frequency.

In a cell that is divided into sectors, the multiple sectors within the cell can be formed by groups of antennas with each antenna responsible for communication with UEs in a portion of the cell. For example, in cell 502, antenna groups 512, 514, and 516 may each correspond to a different sector. In cell 504, antenna groups 518, 520, and 522 each correspond to a different sector. In cell 506, antenna groups 524, 526, and 528 each correspond to a different sector.

The cells 502, 504 and 506 may include several UEs that may be in communication with one or more sectors of each cell 502, 504 or 506. For example, UEs 530 and 532 may be in communication with Node B 542, UEs 534 and 536 may be in communication with Node B 544, and UEs 538 and 540 may be in communication with Node B 546. Here, each Node B 542, 544, 546 is configured to provide an access point to a core network 204 (see FIG. 2) for all the UEs 530, 532, 534, 536, 538, 540 in the respective cells 502, 504, and 506.

For simplicity, hereinbelow in the instant disclosure the term "cell" may include cells from different Node Bs and different sectors from the same Node B.

As a UE (e.g., UE 534) moves about the access network 500, the UE 534 may perform various measurements of signal characteristics of the various cells and send reports on uplink transmissions relating to the quality of those signals. Based in part on these reports, the UTRAN may decide to change the UE's serving cell in a handover procedure by transmitting suitable signaling messages instructing the UE 534 to change its serving cell. Here, a serving cell is that cell on which the UE is camped. Handovers may be hard handovers (e.g., break-before-make) or soft handovers (make-before-break). In a soft handover, the UE may for a certain time be simultaneously connected to two or more cells, i.e., a primary serving cell and one or more secondary serving cells. That is, the UE may maintain an Active Set including multiple cells from one or more Node Bs. As the UE moves or the radio conditions otherwise change, cells may be added to and removed from the Active Set.

In Release 5 of the 3GPP family of standards, High Speed Downlink Packet Access (HSDPA) was introduced. As with previous systems, an HSDPA UE generally monitors and performs measurements of certain parameters of the downlink channel. In HSDPA, however, based on these measurements the UE can provide feedback to the Node B on an uplink transmission.

This feedback can include a Channel Quality Indication (CQI), which generally indicates which estimated transport block size, modulation type, and number of parallel codes could be received correctly with reasonable block error rate (BLER) in the downlink. Here, the CQI reports can be utilized for link adaptation and scheduling algorithms. Thus, the Node B may provide subsequent MAC-hs/MAC-ehs packets to the UE on downlink transmissions having a size, coding format, etc., based on the reported CQI from the UE. In addition, the CQI reports may be utilized for capacity estimation for an air interface.

HSDPA utilizes as its transport channel the high-speed downlink shared channel (HS-DSCH), which may carry user data in the downlink direction. An HS-DSCH Transmission Time Interval (TTI) or interleaving period may be 2 ms (three slots, where each slot is 0.667 ms) in length to achieve a relatively short round trip delay for retransmissions between the UE and the Node B.

The HS-DSCH may be implemented by three physical channels: the high-speed physical downlink shared channel (HS-PDSCH), the high-speed shared control channel (HS-SCCH), and the high-speed dedicated physical control channel (HS-DPCCH). Among these physical channels, the HS-PDSCH may carry user data, and may be dynamically mapped to one or more code channels, as guided by the HS-SCCH.

Figure 6:
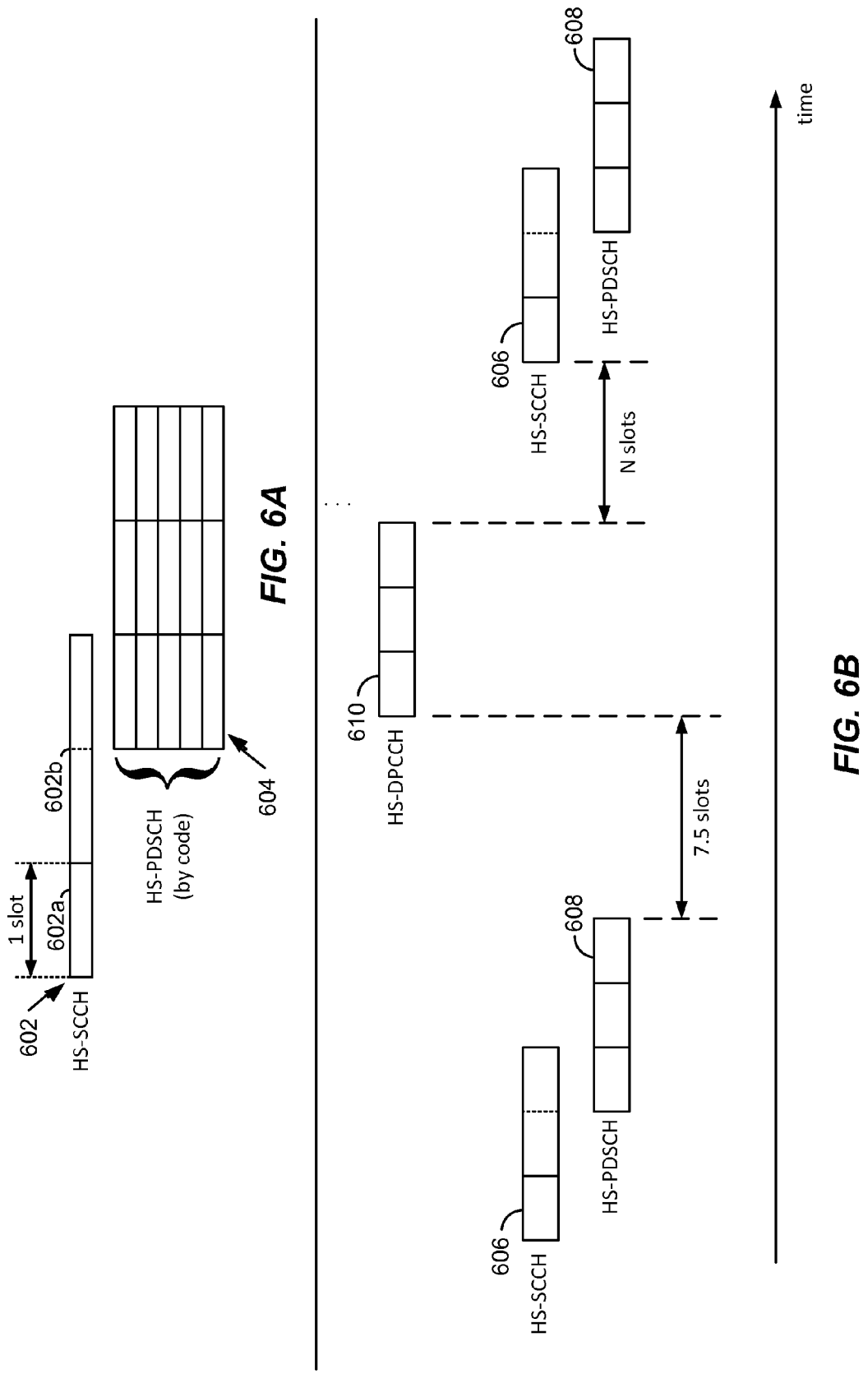
FIGS. 6A and 6B are simplified timing diagrams illustrating the relationship between a downlink physical control channel (HS-SCCH), a downlink physical data channel (HS-PDSCH), and an uplink physical control channel carrying certain feedback (HS-DPCCH) in an HSDPA system.

FIG. 6A illustrates a relationship between control information on the HS-SCCH 602 and downlink data on the HS-PDSCH 604. The UE may continuously monitor the HS-SCCH 602 to determine when to read its data from the HS-PDSCH 604, and the modulation scheme used on the assigned physical channel. Here, the HS-SCCH 602 may be divided into two parts. In the first part 602a, which includes the first of three slots, the HS-SCCH 602 may include certain time-critical information to be utilized by the UE to receive the HS-PDSCH 604, such as which codes to receive and which modulation and spreading factor is being used. The second part 602b, which includes two slots, may include additional information that is less time-critical for the UE. Thus, when a UE monitors the HS-SCCH 602 corresponding to a particular sector or cell, the UE may be enabled to receive and decode downlink data on the corresponding HS-PDSCH 604, if there is data directed to that UE.

On the uplink, the HS-DPCCH may carry feedback signaling from the UE to assist the Node B in taking the right decision in terms of a modulation and coding scheme and a precoding weight selection. For example, this feedback signaling may include a CQI and a PCI. The HS-DPCCH may further include HARQ ACK/NACK signaling to indicate whether a corresponding packet transmission on a prior HS-DSCH was decoded successfully. That is, a UE may provide feedback to a Node B over the HS-DPCCH to indicate whether it correctly decoded a packet on the downlink.

FIG. 6B illustrates a timing relationship for physical layer operation in accordance with an exemplary HSDPA system. Based on various factors, a scheduler in a Node B determines whether to serve a data channel to a UE in a particular TTI and selects a transmission format, such as a modulation and coding scheme, a data rate, etc. The Node B communicates its selection to the UE in the HS-SCCH 606, two slots before the corresponding HS-PDSCH TTI that utilizes this selection. Based on the information carried on the HS-SCCH 606, the UE can determine which HARQ process the data to be sent on the HS-PDSCH belong to, and may decode the corresponding data received on the HS-PDSCH 608. Although HS-PDSCH data is only illustrated in one TTI, the network may continue to transmit data in consecutive TTIs. In this case, the UE may continue to utilize the same HS-SCCH that was used during the previous TTI.

Upon decoding the data on the HS-PDSCH 608, after a delay of 7.5 slots (5 ms), the UE may send on an uplink transmission utilizing the HS-DPCCH 610 a HARQ acknowledgment message corresponding to an outcome of a CRC check on the HS-PDSCH data, as well as CQI/PCI information.

While the timing for the HS-DPCCH feedback beginning 7.5 slots after the end of the HS-PDSCH TTI may be strictly defined in the 3GPP standards (see 3GPP TS 25.211), the timing after the end of the HS-DPCCH and the beginning of the next HS-SCCH transmission is not strictly defined. Thus, some number N of time slots after the HS-DPCCH transmission, the next HS-SCCH 606 transmission for the same HARQ process may begin.

Release 8 of the 3GPP standards brought dual cell HSDPA (DC-HSDPA), wherein a single UE may aggregate downlink information from two adjacent 5-MHz carrier frequencies. That is, in DC-HSDPA, a Node B may provide two HS-DSCH transport channels on two carrier frequencies to a UE in order essentially to double the downlink throughput. Generally, DC-HSDPA utilizes a primary (anchor) carrier and a secondary carrier, where the primary carrier provides the channels for downlink data transmission and the channels for uplink data transmission, and the secondary carrier provides a second set of HS-PDSCHs and HS-SCCHs for downlink communication.

In still later releases of the 3GPP standards, 3C-HSDPA and 4C-HSDPA can provide further increases in user data rates beyond those of DC-HSDPA. Further development in still greater numbers of carriers is ongoing.

According to various aspects of the present disclosure, another form of carrier aggregation that may be referred to as soft aggregation provides for downlink carrier aggregation, wherein the respective downlink carriers utilize the same frequency carrier. Soft aggregation strives to realize similar gains to DC-HSDPA in a single-carrier network.

Figure 7:
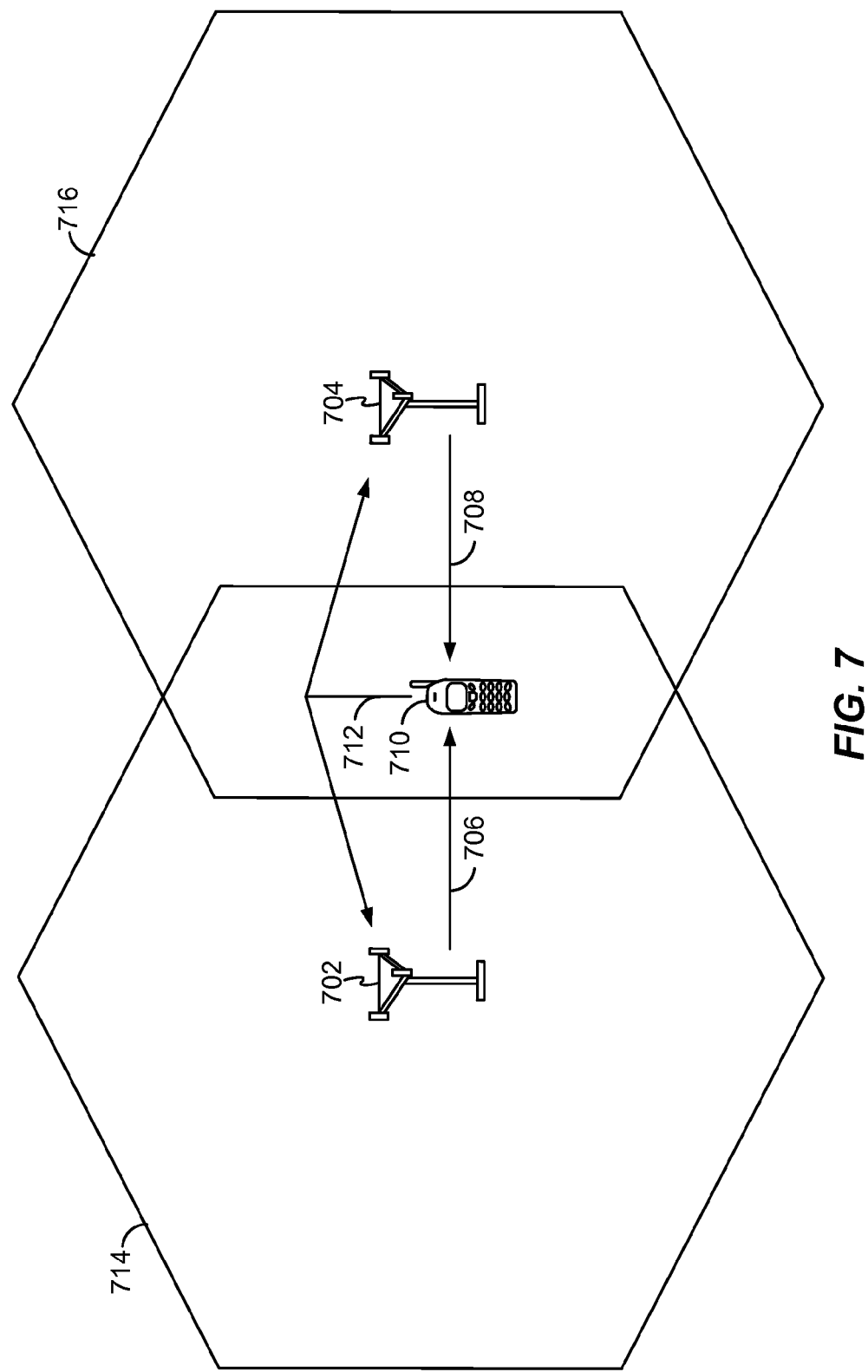
FIG. 7 is a schematic diagram illustrating a UE employing soft aggregation in a SFDC-HSDPA access network.

FIG. 7 illustrates an exemplary system for soft aggregation in accordance with some aspects of the present disclosure. In FIG. 7, there may be a geographic overlap between two or more cells 714 and 716, such that a UE 710 may be served, at least for a certain period of time, by the multiple cells. Thus, a wireless telecommunication system in accordance with the present disclosure may provide HSDPA service from a plurality of cells on a single frequency channel, such that a UE may perform carrier aggregation. For example, a setup utilizing two cells may be referred to as Single Frequency Dual Cell HSDPA (SFDC-HSDPA), Coordinated Multi-Point HSDPA (CoMP HSDPA), or simply Multipoint HSDPA. However, other terminology may freely be utilized. In this way, users at cell boundaries, as well as the overall system, may benefit from a high throughput. Here, the different cells may be provided by the same Node B, or the different cells may be provided by disparate Node Bs.

In the scheme illustrated in FIG. 7, two disparate Node Bs 702 and 704 each provide an HSDPA downlink carrier (e.g., HS-DSCH) 706 and 708, respectively, wherein the downlink carriers are in substantially the same carrier frequency. Of course, as already described, in another aspect, both downlink carriers 706 and 708 may be provided from different sectors of the same Node B. Here, the UE 710 receives and aggregates the downlink carriers and provides an uplink channel 712 (e.g., HS-DPCCH), which is received by both Node Bs 702 and 704. The uplink channel 712 from the UE 710 may provide feedback information, e.g., corresponding to the downlink channel state for the corresponding downlink carriers 706 and 708.

One aspect of the SFDC-HSDPA system is that, being based on an HSDPA framework, the transmissions from the two cells may be asynchronous. That is, slot boundaries for the primary serving cell need not be the same as the slot boundaries for the secondary serving cell. This asynchronicity may arise from the utilization of asynchronous encoding, and/or may arise from different signal propagation delays from disparate Node Bs. In general, even when the physical cells are provided by the same Node B, there may be asynchronicity between the cells due to asynchronous encoding. Given the timeline requirements described above and specified in 3GPP TS 25.211 for HARQ acknowledgment messages, a number of issues may arise due to the lack of synchronization between cells.

That is, as illustrated in FIG. 7, the UE 710 provides a single HS-DPCCH transmission to both cells 714 and 716. Here, the HARQ acknowledgment message may include a jointly encoded HARQ ACK/NACK for both cells. However, because the HS-PDSCH transmitted by the respective cells may not be time-aligned, when a HS-DPCCH transmission arrives at the secondary serving cell, the question may arise as to which HARQ process that feedback belongs to because it may not be exactly 7.5 time slots after the corresponding HS-PDSCH.

Further, particularly when the downlinks are provided by different Node Bs using different clocks, the mis-alignment between downlinks can change over time. That is, the slot boundaries may drift as the clocks utilized by the respective Node Bs may not be precise.

Figure 8:
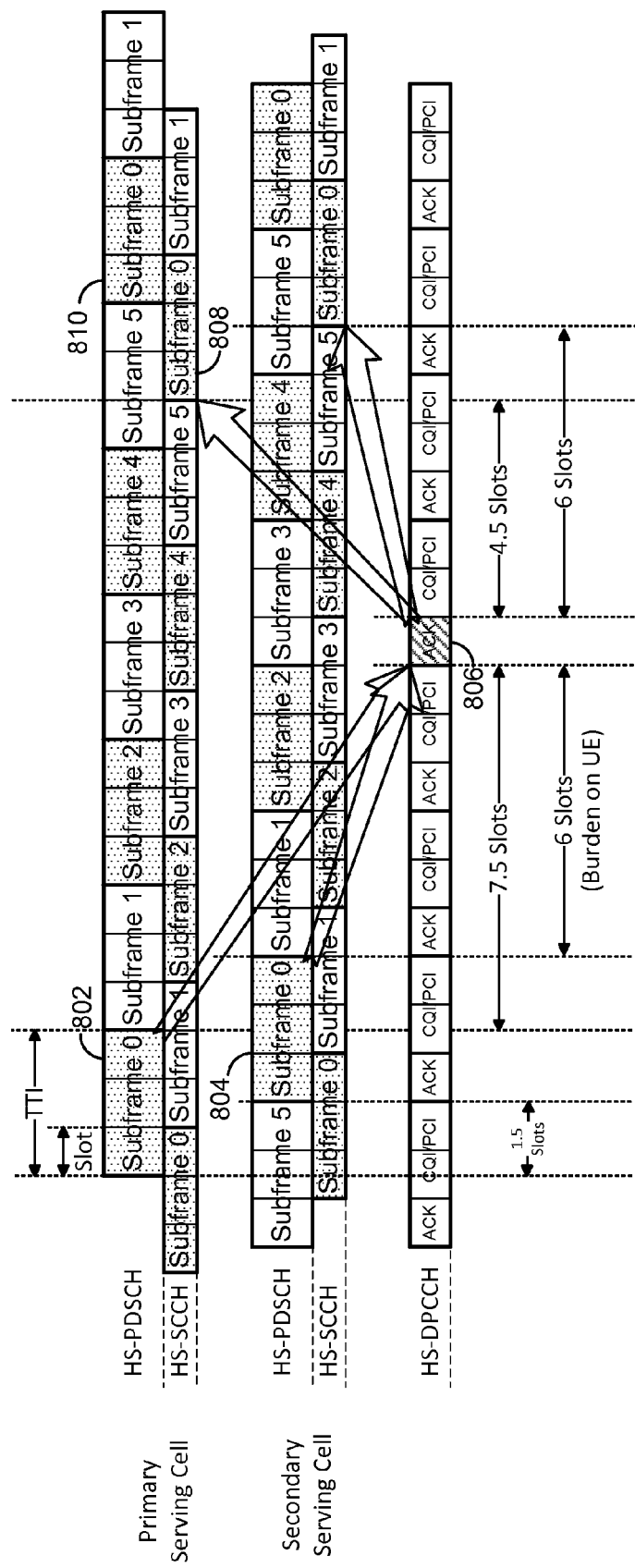
FIGS. 8-9 are timing diagrams illustrating the implications of some possible choices of mis-aligned subframes to associate in a SFDC-HSDPA network.
Figure 9:
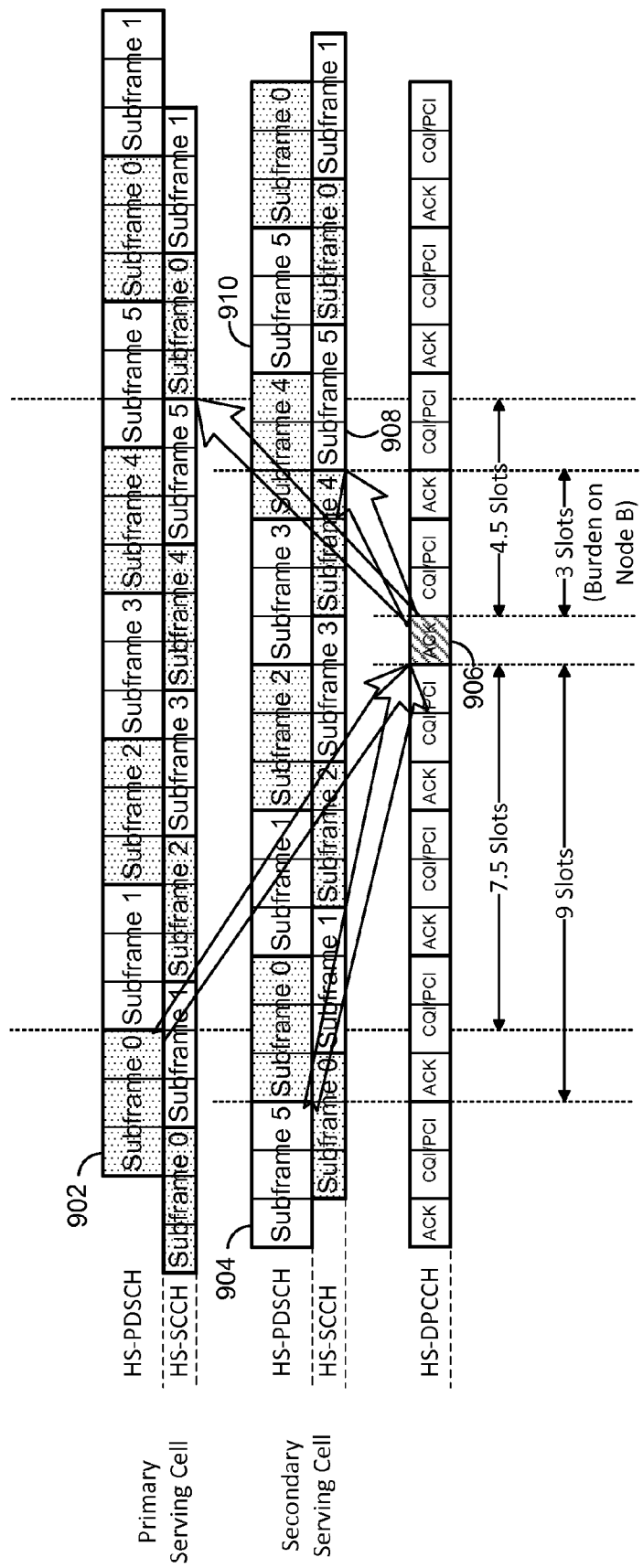
Figure 10:
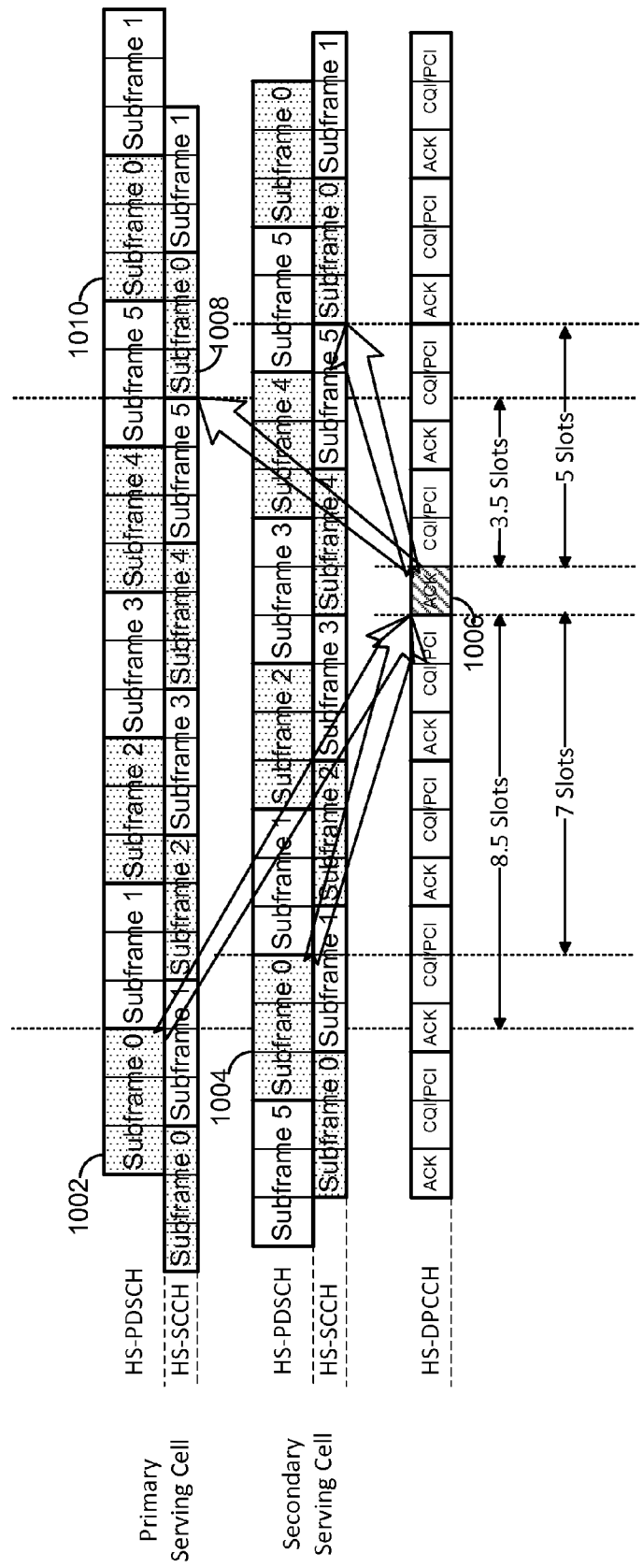
FIG. 10 is a timing diagram illustrating a HS-DPCCH timing selected to distribute the burden of a compressed HARQ timeline between a UE and a Node B.

FIGS. 8-10 are timing diagrams illustrating certain scenarios that may occur due to asynchronous timing between a first cell and a second cell, where, by way of example, six hybrid automatic repeat request (HARQ) processes are configured such that there are six subframes, i.e., Subframe 0-Subframe 5. Referring to FIG. 7, by way of example, UE 710 will be considered as being served by a primary serving cell 714 and a secondary serving cell 716. The diagrams of FIGS. 8-10 are illustrated from the UE's point of view, i.e., the timing is illustrated at the time of arrival at the UE. However, in general, propagation delays between the respective Node Bs and the UE are very small compared to the slot width. Thus, for the purposes of the present disclosure, the timing is substantially the same from a Node B point of view.

Referring now to FIGS. 8 and 9, the mis-alignment is such that a second Subframe0 transmitted on the HS-PDSCH by the secondary serving cell is received at the UE approximately 1.5 slots later than a first Subframe0 transmitted by the primary serving cell. That is, the slot boundaries for the secondary serving cell are offset by 1.5 slots (1 ms) relative to the slot boundaries for the primary serving cell. Of course, the illustrated mis-alignment of 1.5 subframes is only exemplary and is shown here for illustrative purposes and is not intended to be limiting. That is, in various systems within the scope of the present disclosure the mis-alignment of subframes may be any arbitrary amount, and may not be determinable a priori.

Here, the label "Subframe0" is merely nominal, and does not necessarily represent an association between respective subframes. In the example illustrated in FIG. 8, a first Subframe0 802 transmitted by the primary serving cell is associated with a second Subframe0 804 transmitted by the secondary serving cell. However, in FIG. 9, a Subframe0 902 transmitted by the primary serving cell is associated with a Subframe5 904 transmitted by the secondary serving cell. Taken together, as will be seen below, FIGS. 8 and 9 illustrate certain implications of the association of different subframes with one another when the subframes have the same mis-alignment.

Returning now to FIG. 8, due to the association of the second Subframe0 804 with the first Subframe0 802, the UE 710 has a compressed HARQ timeline, i.e., less time to generate the HARQ acknowledgment message 806 corresponding to the second Subframe0 804. That is, as described above, the UE 710 generally transmits a HARQ acknowledgment message 806 with a timing such that the slot containing the HARQ acknowledgment message 806 begins 7.5 slots after the end of the corresponding subframe 802 transmitted by the primary serving cell. However, in this example, the associated subframe 804 from the secondary serving cell is received at the UE 710 1.5 slots later, while the timing for the HARQ acknowledgment message still corresponds to the subframe 802 from the primary serving cell. This time compression generally means that the UE 710 may be required to decode the data in the second Subframe0 804, calculate and verify the corresponding CRC, and insert the resulting HARQ ACK/NACK into the slot 806 of the HS-DPCCH transmission in a relatively short time (i.e., 6 slots) compared to the conventional 7.5 slots. In some examples, a UE may have adequate processing power to suitably handle the calculations in the shortened time. However, in an aspect of the present disclosure, limitations on the processing capabilities of certain UEs may be taken into account in determining which subframes between the primary serving cell and the secondary serving cell to associate with one another.

When the UE 710 transmits the HARQ acknowledgment message corresponding to the set of associated subframes 802 and 804, the corresponding Node Bs receive the message and determine whether a HARQ retransmission of the packet is desired. For example, if the HARQ acknowledgment message 806 includes a negative acknowledgment indicating a CRC failure corresponding to the information contained in the first Subframe0 802 transmitted by the primary serving cell, depending on whether the HARQ retransmission limit has been exceeded a retransmission of the packet may be implemented. Here, if a retransmission is to take place, the Node B corresponding to the primary serving cell generates an HS-SCCH transmission 808 including control information to enable the UE 710 to decode the next Subframe0 810 in the same HARQ process. As seen here, in the illustrated example wherein the subframe from the secondary serving cell has slot boundaries 1.5 slots later than those of the associated subframe from the primary serving cell, the HARQ timeline is relaxed for the Node B corresponding to the secondary serving cell. That is, with the illustrated selection of subframes to associate with one another, the Node B corresponding to the secondary serving cell has time corresponding to 6 slots as opposed to the conventional 4.5 slots to respond to the HARQ acknowledgment message.

In the example illustrated in FIG. 9, however, although the same mis-alignment exists as that illustrated in FIG. 8, a different subframe transmitted by the secondary serving cell is associated with the Subframe0 902 transmitted by the primary serving cell. That is, Subframe0 902 transmitted by the primary serving cell is associated with Subframe5 904 transmitted by the secondary serving cell. With this selection of subframes to associate with one another, the UE 710 has extra time to process the data in Subframe5 904, e.g., 9 slots to determine the suitable HARQ ACK/NACK corresponding to the packet in Subframe5 904 and generate the HARQ acknowledgment message 906. However, the Node B corresponding to the secondary serving cell has only 3 slots' time to respond to a HARQ acknowledgment message 906 requesting a HARQ retransmission. Thus, the Node B corresponding to the secondary serving cell may be required to begin transmission of the HS-SCCH subframe 908 for the secondary serving cell for the corresponding HARQ process in the next Subframe5 910 in a shortened period of time as compared to the conventional 4.5 slots.

Thus, as seen in FIGS. 8 and 9, with the same mis-alignment between the primary serving cell and the secondary serving cell, the onus to perform certain calculations more quickly can be placed on either the UE or the Node B, depending on a choice of which subframe transmitted by the secondary serving cell to associate with the subframe transmitted by the primary serving cell.

In the examples illustrated in FIGS. 8 and 9, an overlapping subframe corresponding to the secondary serving cell was chosen to be associated with the subframe corresponding to the primary serving cell. That is, in FIG. 8, the second Subframe0 804 at least partially overlaps in time with the first Subframe0 802, and in FIG. 9, Subframe5 904 at least partially overlaps in time with Subframe0 902. However, in various aspects in accordance with the present disclosure, it is not necessary that the associated subframes overlap in time, and any suitable association of subframes may be chosen.

FIG. 10 is an illustration of another aspect of the present disclosure for distributing the burden between the UE and the Node B. Here, the conventional 7.5 slot delay from the end of the subframe 1002 from the primary serving cell until the beginning of the transmission of the HARQ acknowledgment message 1006 is not required. That is, in an aspect of the present disclosure, the timing of the HARQ acknowledgment message 1006 transmitted on the HS-DPCCH may be chosen to distribute the burden of the compressed HARQ timeline between the UE and the Node B. In the illustrated example, compared to the example illustrated in FIG. 8, although the same mis-alignment exists between the primary serving cell and the secondary serving cell, and the same association between the first Subframe0 802/1002 and the second Subframe0 804/1004 is chosen, the HARQ timeline for the UE processing the packet from secondary serving cell is only slightly compressed from the standard 7.5 slots to 7 slots; and the HARQ timeline for the Node B corresponding to the primary serving cell for responding to the HARQ acknowledgment message and generating the control packet on the HS-SCCH is only slightly compressed from the standard 4.5 slots to 3.5 slots.

Figure 11:
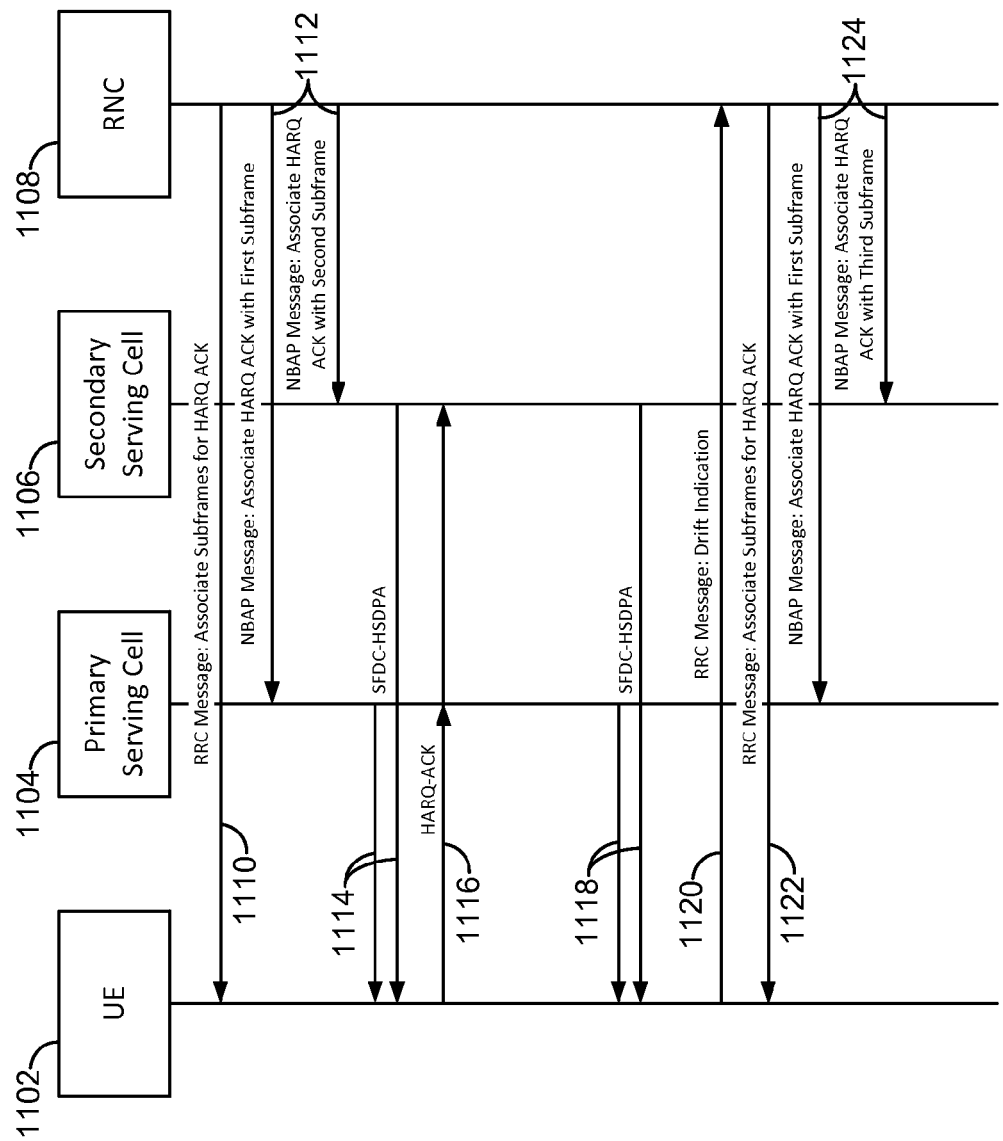
FIG. 11 is a call flow diagram illustrating a process of wireless communication for timing control.

FIG. 11 is a call flow diagram illustrating a process for wireless communication in accordance with some aspects of the present disclosure. The following description will refer to FIG. 11 to describe exemplary processes for addressing a mis-alignment of subframes between serving cells in an SFDC-HSDPA network. In some aspects of the disclosure, at least a portion of the processes illustrated in FIG. 11 may be implemented by a UE 1102. Here, the UE 1102 may be the same as the UE 450 illustrated in FIG. 4. Further, at least a portion of the processes illustrated in FIG. 11 may be implemented by a Node B corresponding to at least one of a primary serving cell 1104 or a secondary serving cell 1106. That is, the primary serving cell 1104 may be provided by the same Node B as the secondary serving cell 1106 or by a disparate Node B from the Node B that provides the secondary serving cell 1106. Here, the one or more Node Bs providing the primary serving cell 1104 and the secondary serving cell 1106 may be the same as the Node B 410 illustrated in FIG. 4. Still further, at least a portion of the processes illustrated in FIG. 11 may be implemented by an RNC 1108. Here, the RNC 1108 may be the same as the RNC 306 illustrated in FIG. 3. Still further, at least a portion of the processes illustrated in FIG. 11 may be implemented by a processing system 114 as illustrated in FIG. 1. Of course, in various aspects of the present disclosure, the processes illustrated in FIG. 11 may be implemented by any suitable apparatus or means for executing the described functions.

In accordance with an aspect of the present disclosure, the network, e.g., the RNC 1108 may determine which subframe corresponding to the secondary serving cell is to be associated with which subframe corresponding to the primary serving cell. That is, a set of associated subframes may be constructed, including one or more subframes from each of a plurality of potentially mis-aligned cells. Here, such a determination of which subframes to include in the set may be based on any number of factors, such as the compressibility of the HARQ timeline at the UE and/or at the Node B since, as described above, different selections may require faster processing at one of the UE or the Node B. That is, if a certain UE 1102 is for any reason unable to generate the HARQ acknowledgment message in time, or if for any reason such an accelerated generation of the HARQ acknowledgment message is undesired, then a selection may be made to place the onus on the Node B to respond to the HARQ acknowledgment message more quickly. Similarly, if a Node B is for any reason unable to respond to the HARQ acknowledgment message in an accelerated time, or if for any reason such an accelerated response to the HARQ acknowledgment message is undesired, then a selection may be made to place the onus on the UE 1102 to generate the HARQ acknowledgment message more quickly.

Once the determination to associate the subframes has been made, the RNC 1108 may then inform the UE 1102 of the set of associated subframes by transmitting an indication 1110 to associate a particular subframe of the primary serving cell 1104 with a particular subframe of the secondary serving cell 1106, so as to construct the set of subframes. In one example, an RRC message may be utilized to inform the UE 1102 of the associated subframes. Here, associated subframes are subframes on the primary serving cell 1104 and secondary serving 1106 cell that share a time slot for a HARQ acknowledgment message.

The RRC message 1110 may utilize the control plane at the RRC layer 216, as illustrated in FIG. 2. That is, the RNC 1108 may transmit the message 1110 by way of the primary serving cell 1104. At the link layer, the indication 1110 to associate the respective subframes may utilize the air interface between the Node B corresponding to the primary serving cell 1104 and the UE 1102, e.g., being transmitted by a transmitter 432 of a Node B 410 and received by a receiver 454 of a UE 450 as illustrated in FIG. 4.

Further, the RNC 1108 may inform the Node B or Node Bs (in the case that the primary serving cell 1104 and secondary serving cell 1106 are provided by disparate Node Bs) of the HARQ timeline for transmitted packets, i.e., which HARQ acknowledgment message corresponds to which transmitted packet. In one example, the RNC may utilize NBAP messages 1112 over an Iub interface to provide an indication to associate the HARQ acknowledgment message with a particular subframe.

Here, the primary serving cell 1104 and the secondary serving cell 1106 may each provide a respective HS-DSCH (e.g., in the same carrier frequency) to the UE 1102 in a SFDC-HSDPA (also called a Multipoint HSDPA) air interface. Here, the subframe boundaries for the primary and secondary serving cells may not be aligned, as the SFDC-HSDPA system is asynchronous, as described above. The UE 1102 receives the respective first and second downlinks, calculates and generates a HARQ-ACK for the set of associated subframes in the respective downlinks, and transmits, in a single subframe, a HARQ acknowledgment message 1116 corresponding to the set of associated subframes.

In some aspects of the present disclosure, the association between the respective subframes indicated in the RRC message 1110 from the RNC 1108 to the UE 1102 may not be immediate from the UE's standpoint. That is, after receiving the indication, the association between the respective subframes may occur at some known time in the future. For example, in some aspects of the present disclosure, the association at the UE 1102 may occur in a given time, e.g., a predetermined time after the receiving of the indication. In other examples, the indication 1110 to associate subframes to construct the set of associated subframes may include further information relating to a time at which the association is to take effect. In this fashion the UE 1102 may wait the indicated amount of time until the association takes effect.

In this fashion, jointly encoded HARQ feedback for two serving cells 1104 and 1106 can reliably be achieved although the alignment of subframes between the primary serving cell 1104 and the secondary serving cell 1106 is asynchronous. Further aspects of the present disclosure can provide for similarly reliable HARQ feedback for more than two mis-aligned serving cells. That is, further development of wireless communication systems is ongoing, and more than two downlinks may be provided to a particular UE. For example, dual frequency, 4-cell HSDPA (DF4C-HSDPA) and other systems are currently undergoing development within 3GPP. In such systems, the mis-alignment of subframes may occur across any number of the serving cells. Thus, in various aspects of the present disclosure, the set of associated cells may be enlarged to associate any suitable number of subframes from corresponding serving cells.

Here, the indication provided by the RNC to the UE may include information for associating any number of subframes, e.g., a third subframe, a fourth subframe, etc., from corresponding serving cells, e.g., a third cell, a fourth cell, etc. Further, the RNC may provide NBAP messages to two, three, four, or any suitable number of Node Bs to inform the corresponding Node B of the HARQ timeline associating a particular HARQ acknowledgment message with a particular subframe from that cell.

While aspects of the present disclosure described above can provide for alignment of HARQ messaging in a wireless communication system with mis-aligned subframes, a further issue that may occur with non-co-located cells utilizing different clocks is that the alignment between the disparate cells can drift over time. That is, because disparate cells may each have their own oscillator or clock, and the timing may not be precise, the difference in alignment in subframes from the disparate cells can change over time. When the timing drifts, the compression of the HARQ timeline on either the UE or the Node B can get worse over time, eventually, potentially resulting in a failure.

Thus, a further aspect of the present disclosure provides for a determination of the drift, and according certain criteria, a changing of the associated subframes.

For example, referring again to FIG. 11, when the UE 1102 receives a further transmission 1118 of a set of subframes from the primary and secondary serving cells 1104 and 1106 with associated subframes as described above, in accordance with an aspect of the present disclosure the UE 1102 may determine a timing difference between subframes of the set of associated subframes. The UE 1102 may provide, on an uplink transmission, an indication 1120 corresponding to the drift. In some examples, the indication 1120 may be provided by the UE 1102 periodically, or the indication 1120 may be provided by the UE 1102 under certain conditions. In a particular example, the indication 1120 may be provided by the UE 1102 when the timing difference between the subframes drifts by an amount greater than some threshold (e.g., a predetermined threshold). Here, the transmitted indication 1120 may be an RRC message provided to the RNC 1108 indicating that the timing offset between the mis-aligned subframes has drifted by an amount greater than the threshold.

Based on the indication of the drift 1120, or based on any other suitable reason, the network (e.g., the RNC 1108) may determine to change the set of associated subframes. In one example, the subframe from the secondary serving cell 1106 may be switched with a different subframe of the secondary serving cell 1106 to be associated with the first subframe of the primary serving cell 1104. For example, when the indication 1120 received from the UE 1102 that the drift in the timing difference is such that the association of the second subframe from the secondary serving cell 1106 with the first subframe from the primary serving 1104 cell no longer makes sense, the RNC 1108 may determine to change the association to associate a third subframe of the secondary serving cell 1106, other than the second subframe, with the first subframe from the primary serving cell 1104. Thus, the RNC 1108 may provide an indication 1122, e.g., an RRC message, to the UE 1102 to associate the first subframe from the primary serving cell 1104 with a third subframe of the secondary serving cell 1106, other than the second subframe of the secondary serving cell 1106. Further, the RNC 1108 may provide suitable signaling 1124, such as NBAP signaling, to the respective serving cells 1104 and 1106 indicating the new association between future HARQ acknowledgment messages from the UE 1102 and the respective subframes from the serving cells 1104 and 1106.

In some examples, existing signaling can be at least partially re-used to manage the drift as described above. That is, in a conventional DC-HSDPA system wherein a primary serving cell and a secondary serving cell are provided to a UE over different carrier frequencies, a drift issue is known to occur. Here, when DPCH/F-DPCH frame boundaries of the primary serving cell and the secondary serving cell drift by +/−148 chips, the UE sends an RRC message (e.g., an RRC measurement report message) to the RNC indicating this condition. In an aspect of the present disclosure, the RRC measurement report message may be utilized as the indication 1120, wherein the RRC measurement report message is adapted to include the information relating to the association between subframes in the set. Further, an RRC message (e.g., an RRC measurement control message including an indication of Event 6E, 6F, or 6G) may be re-used to respond to the indication 1120, wherein the RRC measurement control message 1122 may be adapted to include the information relating to the new association between subframes in the set. Further, the RNC 1108 may send the NBAP messages 1124 to the respective serving cells to update the association between respective subframes, as described above.

In general, the drift issue arises when the primary serving cell and the secondary serving cell are provided by disparate Node Bs. In a system where the primary serving cell and the secondary serving cell are provided by the same Node B, the clock may be shared for the respective serving cells. When the clock is shared for the respective serving cells, the drift issue may not occur. However, the mis-alignment between the respective serving cells may be an issue due to asynchronous coding, so signaling to associate subframes for the respective serving cells may be utilized.

Thus, in another aspect of the present disclosure, when the primary serving cell and the secondary serving cell are provided by the same Node B, or when they otherwise share a clock such that drift does not occur, an association between a first subframe from the primary serving cell and a second subframe from the secondary serving cell may be hard-coded. That is, a rule (e.g., a predetermined alignment rule) may be applied such that signaling is not required to determine which subframes are associated with one another.

FIGS. 12A-12D illustrate particular examples of alignment rules being applied to mis-aligned subframes. For example, one such rule as illustrated in FIG. 12A may construct a set associating a first subframe 1202 and second a subframe 1204 when an ending boundary 1206 of the first subframe 1202 from a first serving cell is within the boundaries of a subframe from a second serving cell 1204. In another example as illustrated in FIG. 12B, a rule may associate a first subframe 1208 and a second subframes 1210 when a beginning boundary 1212 of the first subframe 1208 from a first serving cell is within the boundaries of the second subframe 1210 from a second serving cell. In another example as illustrated in FIG. 12C, a rule may associate a first subframe 1214 and a second subframe 1216 when a majority 1218 of the first subframe 1214 from a first serving cell is within the boundaries of the second subframe 1216 from a second serving cell. In another example as illustrated in FIG. 12D, a rule may associate a first subframe 1220 and a second subframe 1222 when a minority 1224 of the first subframe 1220 from a first serving cell is within the boundaries of the second subframe 1222 from a second serving cell. Of course, any other suitable rule for associating first and second subframes may be utilized within the scope of the present disclosure.

Figure 13:
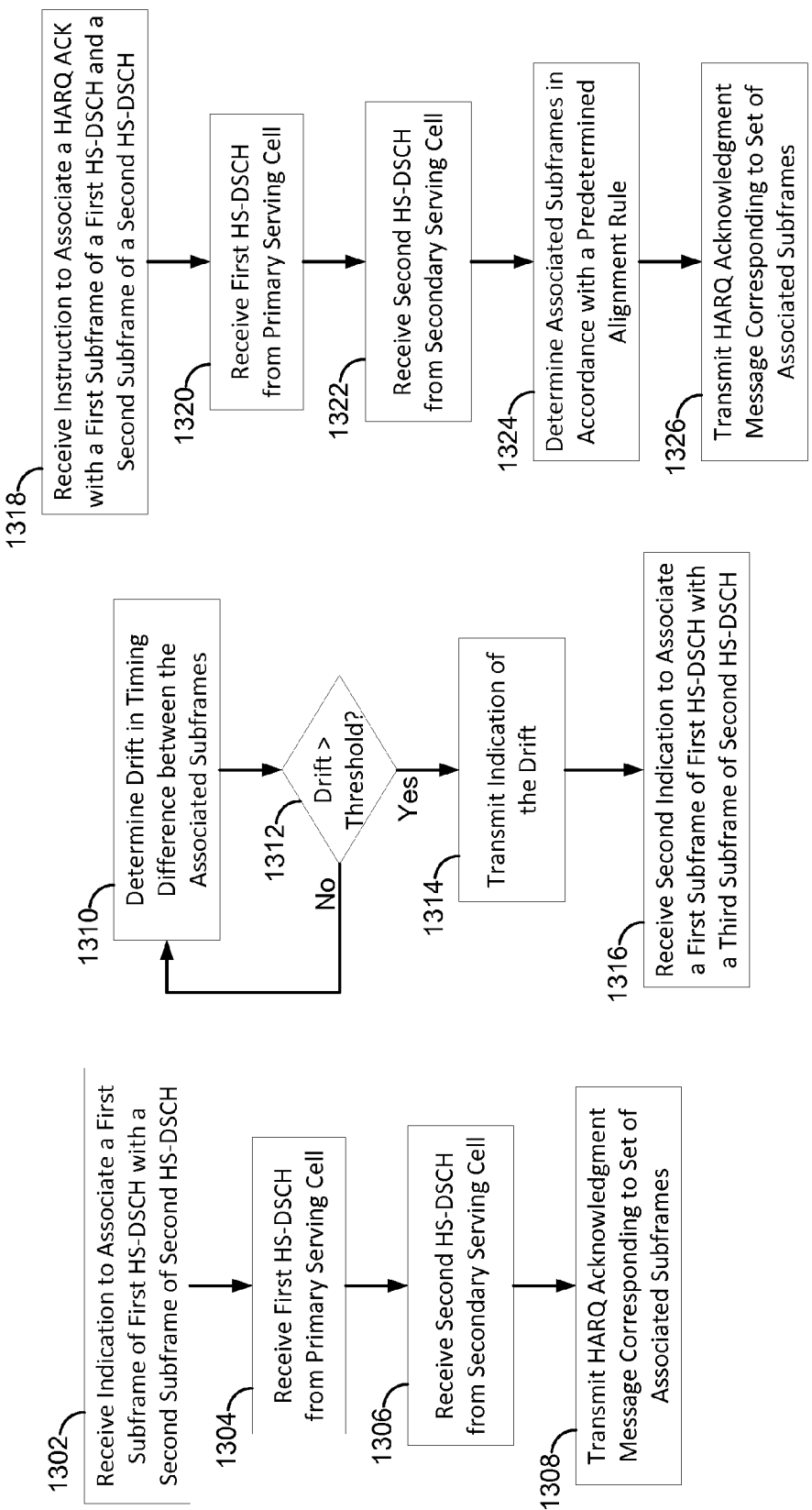
FIG. 13 is a flow chart illustrating a process for wireless communication that may be implemented by a UE.

FIG. 13 is a flow chart illustrating exemplary processes for wireless communication in accordance with some aspects of the present disclosure. Here, the processes illustrated in FIG. 13 may be implemented by a UE, e.g., the UE 450 illustrated in FIG. 4. Thus, the following description will refer periodically to FIG. 4. However, in some aspects, the processes illustrated in FIG. 13 may be implemented by an apparatus, a processing system, a computer program product, or any suitable means for performing the described functions.

In block 1302, the process receives an indication to associate a first subframe of a first downlink with a second subframe of a second downlink to construct a set of associated subframes. For example, RRC signaling utilizing an RRC layer 216 (see FIG. 2) may be utilized, and at the link layer, the receiver 454 (see FIG. 4) may implement the receiving of the indication. In block 1304, the process receives the first downlink from a primary serving cell, and in block 1306, the process receives the second downlink from a secondary serving cell. Again, the receiving of the respective downlinks may be implemented by the receiver 454 (see FIG. 4). In an aspect of the present disclosure, the respective first and second downlinks may have mis-aligned subframe boundaries. In block 1308, in accordance with the set of associated subframes, the process may transmit, in a single subframe, a HARQ acknowledgment message that includes jointly encoded HARQ feedback for the set of associated subframes. Here, the transmitting of the HARQ acknowledgment message may be implemented by the transmitter 456 of the UE 450 (see FIG. 4).

In block 1310, after receiving the associated first and second subframes, the process may determine a drift in a timing difference between the associated first and second subframes. Here, the determination of the drift may be implemented by a processor 490 of a UE (see FIG. 4). In block 1312, the process may determine whether the determined drift is greater than some threshold (e.g., a predetermined threshold). Again, the determination of whether the drift is greater than the threshold may be implemented by the processor 490. If the process determines that the drift is not greater than the threshold, then the process may go back to any suitable earlier block, or the process may end. If, however, the process determines that the drift is greater than the threshold, then in block 1314, the process may transmit an indication of the drift, e.g., utilizing an RRC message. Here, the transmission of the indication of the drift may be implemented by a transmitter 456 of the UE 450 (see FIG. 4). In block 1316, in response to the indication of the drift, the process may receive a second indication adapted to associate the first subframe of the first downlink with a third, different subframe of the second downlink. Here, the third subframe may align with the first subframe in such a manner as to reduce the burden of the compressed HARQ timeline on one or both of the UE or the Node B. The receiving of the second indication may be implemented by a receiver 454 of the UE 450 (see FIG. 4), and may be in the form of an RRC measurement control message that includes an indication of at least one of event 6E, event 6F, or event 6G. That is, the event 6E, 6F, and 6G messages as defined in the Radio Resource Control (RRC) Specification, 3GPP TS 25.331, may be modified to include the information relating to the set of associated subframes.

In another aspect of the disclosure, in block 1318, the process may receive an instruction to associate a future HARQ acknowledgment message corresponding to a first downlink and a second downlink, with the timing of a first subframe from the first downlink. Here, the receiving of the instruction may be implemented by the receiver 454 of the UE 450 (see FIG. 4). In block 1320, the process may receive the first downlink from the primary serving cell, and in block 1322, the process may receive the second downlink from the secondary serving cell. Again, the receiving of the respective downlinks may be implemented by the receiver 454 (see FIG. 4). In block 1324, the process may determine an association of the first subframe with the second subframe in accordance with a certain alignment rule (e.g., a predetermined alignment rule) to construct a set of associated subframes. Here, the determination of the association between the respective subframes may be implemented by the processor 490 (see FIG. 4). The alignment rule may be one of the rules illustrated in FIG. 12, or any other suitable alignment rule. In accordance with the determination of the set of associated subframes, in block 1326, the process may transmit, in a single subframe, a HARQ acknowledgment message that includes information corresponding to the set of associated subframes. Again, the transmission of the HARQ acknowledgment message may be implemented by the transmitter 456 (see FIG. 4).

Figure 14:
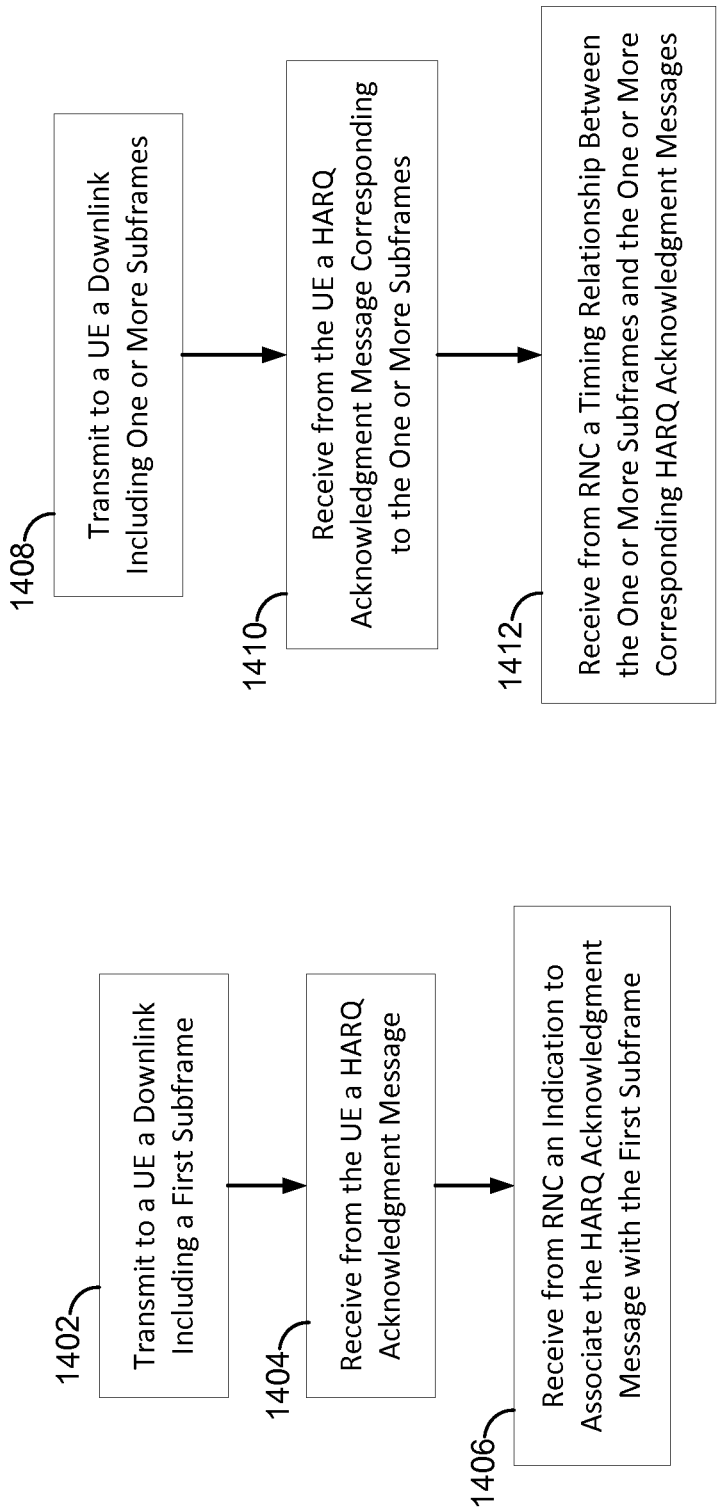
FIG. 14 is a flow chart illustrating a process for wireless communication that may be implemented by a Node B.

FIG. 14 is a flow chart illustrating exemplary processes for wireless communication in accordance with further aspects of the present disclosure. Here, the processes illustrated in FIG. 14 may be implemented by a Node B, e.g., the Node B 410 illustrated in FIG. 4. Thus, the following description will refer periodically to FIG. 4. However, in some aspects, the processes illustrated in FIG. 14 may be implemented by an apparatus, a processing system, a computer program product, or any suitable means for performing the described functions. The processes illustrated in FIG. 14 relate to associating a HARQ acknowledgment message with a particular subframe, which may begin other than 7.5 slots after the end of the associated HARQ acknowledgment message. In some aspects the processes may refer to implementations for a Node B corresponding to a secondary serving cell.

In block 1402, the process may transmit to a UE a downlink including a first subframe. Here, the transmission of the downlink may be implemented by the transmitter 432 of the Node B 410 (see FIG. 4). In block 1404, the process may receive from the UE a HARQ acknowledgment message. Here, the receiving of the message from the UE may be implemented by the receiver 435 of the Node B 410. At this time, the Node B may not have sufficient information to determine to which HARQ process the HARQ acknowledgment message belongs. Thus, in block 1406, the process may receive from an RNC, e.g., utilizing NBAP signaling, an indication to associate the received HARQ acknowledgment message with the received first subframe. Here, the receiving of the NBAP message may be implemented by the data source 412 (see FIG. 4); in further aspects, the NBAP message may be received over an Iub interface between the RNC and the Node B, as illustrated in FIGS. 3 and 11.

In block 1408, the process may transmit to a UE a downlink including one or more subframes. Again, the transmission of the downlink may be implemented by the transmitter 432 of the Node B 410 (see FIG. 4). In block 1410, the process may receive from the UE a HARQ acknowledgment message corresponding to the one or more transmitted subframes. Here, the receiving of the HARQ acknowledgment message may be implemented by the receiver 435 of the Node B 410. In block 1412, the process may receive from an RNC, e.g., utilizing NBAP signaling, a timing relationship between the one or more subframes and the one or more corresponding HARQ acknowledgment messages. This way, in accordance with an alignment rule, the Node B can determine to which subframe the received HARQ acknowledgment messages correspond. Again, the receiving of the NBAP message may be implemented by the data source 412 (see FIG. 4); in further aspects, the NBAP message may be received over an Iub interface between the RNC and the Node B, as illustrated in FIGS. 3 and 11.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
receiving a first downlink from a first cell;
receiving a second downlink from a second cell;
receiving an indication to associate a first subframe of the first downlink with a second subframe of the second downlink to construct a set; and
transmitting in a single subframe a hybrid automatic repeat request (HARQ) acknowledgment message corresponding to the set.

2. The method of claim 1, further comprising:
determining a drift in a timing difference between the first subframe and the second subframe; and
transmitting an indication of the drift.

3. The method of claim 2, wherein the transmitting of the indication comprises transmitting the indication when the drift is greater than a predetermined threshold.

4. The method of claim 2, further comprising:
receiving a second indication in response to the indication of the drift, the second indication adapted to associate the first subframe of the first downlink with a third subframe of the second downlink, other than the second subframe of the second downlink.

5. The method of claim 4, wherein the indication comprises an RRC measurement control message comprising an indication of at least one of event 6E, event 6F, or event 6G.

6. The method of claim 1, wherein the indication comprises an RRC measurement control message comprising an indication of at least one of event 6E, event 6F, or event 6G.

7. The method of claim 1, wherein the indication further comprises information relating to a time when the association between the first subframe and the second subframe is to take effect.

8. The method of claim 1, further comprising:
receiving a third downlink from a third cell; and
receiving a fourth downlink from a fourth cell,
wherein the indication is further adapted to associate a third subframe of the third downlink with a fourth subframe of the fourth downlink to construct the set.

9. A method of wireless communication, comprising:
receiving a first downlink from a first cell;
receiving a second downlink from a second cell;
determining an association of a first subframe of the first downlink with a second subframe of the second downlink in accordance with a predetermined alignment rule; and
transmitting in a single subframe a hybrid automatic repeat request (HARQ) acknowledgment message comprising information corresponding to the first subframe and the second subframe.

10. The method of claim 9, further comprising:
receiving an instruction to associate a HARQ acknowledgment message corresponding to the first downlink and the second downlink in accordance with the timing of the first subframe,
wherein the determining of the association comprises associating the first subframe with the second subframe in accordance with the instruction.

11. A method of wireless communication, comprising:
transmitting to a user equipment (UE) a downlink comprising a first subframe;
receiving from the UE a hybrid automatic repeat request (HARQ) acknowledgment message; and
receiving from a Radio Network Controller (RNC) an indication to associate the HARQ acknowledgment message with the first subframe.

12. A method of wireless communication, comprising:
transmitting to a user equipment (UE) a downlink comprising one or more subframes;
receiving from the UE one or more hybrid automatic repeat request (HARQ) acknowledgment messages corresponding to the one or more subframes; and
receiving from a Radio Network Controller (RNC) a timing relationship between the one or more subframes and the one or more corresponding HARQ acknowledgment messages.

13. An apparatus for wireless communication, comprising:
means for receiving a first downlink from a first cell;
means for receiving a second downlink from a second cell;
means for receiving an indication to associate a first subframe of the first downlink with a second subframe of the second downlink to construct a set; and
means for transmitting in a single subframe a hybrid automatic repeat request (HARQ) acknowledgment message corresponding to the set.

14. The apparatus of claim 13, further comprising:
means for determining a drift in a timing difference between the first subframe and the second subframe; and
means for transmitting an indication of the drift.

15. The apparatus of claim 14, wherein the means for transmitting the indication comprises means for transmitting the indication when the drift is greater than a predetermined threshold.

16. The apparatus of claim 14, further comprising:
means for receiving a second indication in response to the indication of the drift, the second indication adapted to associate the first subframe of the first downlink with a third subframe of the second downlink, other than the second subframe of the second downlink.

17. The apparatus of claim 16, wherein the indication comprises an RRC measurement control message comprising an indication of at least one of event 6E, event 6F, or event 6G.

18. The apparatus of claim 13, wherein the indication comprises an RRC measurement control message comprising an indication of at least one of event 6E, event 6F, or event 6G.

19. The apparatus of claim 13, wherein the indication further comprises information relating to a time when the association between the first subframe and the second subframe is to take effect.

20. The apparatus of claim 13, further comprising:
means for receiving a third downlink from a third cell; and
means for receiving a fourth downlink from a fourth cell,
wherein the indication is further adapted to associate a third subframe of the third downlink with a fourth subframe of the fourth downlink to construct the set.

21. An apparatus for wireless communication, comprising:
means for receiving a first downlink from a first cell;
means for receiving a second downlink from a second cell;
means for determining an association of a first subframe of the first downlink with a second subframe of the second downlink in accordance with a predetermined alignment rule; and
means for transmitting in a single subframe a hybrid automatic repeat request (HARQ) acknowledgment message comprising information corresponding to the first subframe and the second subframe.

22. The apparatus of claim 21, further comprising:
means for receiving an instruction to associate a HARQ acknowledgment message corresponding to the first downlink and the second downlink in accordance with the timing of the first subframe,
wherein the means for determining the association comprises means for associating the first subframe with the second subframe in accordance with the instruction.

23. An apparatus for wireless communication, comprising:
means for transmitting to a user equipment (UE) a downlink comprising a first subframe;
means for receiving from the UE a hybrid automatic repeat request (HARQ) acknowledgment message; and
means for receiving from a Radio Network Controller (RNC) an indication to associate the HARQ acknowledgment message with the first subframe.

24. An apparatus for wireless communication, comprising:
means for transmitting to a user equipment (UE) a downlink comprising one or more subframes;
means for receiving from the UE one or more hybrid automatic repeat request (HARQ) acknowledgment messages corresponding to the one or more subframes; and
means for receiving from a Radio Network Controller (RNC) a timing relationship between the one or more subframes and the one or more corresponding HARQ acknowledgment messages.

25. A computer program product, comprising:
a non-transitory computer-readable medium comprising:
instructions for causing a computer to receive a first downlink from a first cell;
instructions for causing a computer to receive a second downlink from a second cell;
instructions for causing a computer to receive an indication to associate a first subframe of the first downlink with a second subframe of the second downlink to construct a set; and
instructions for causing a computer to transmit in a single subframe a hybrid automatic repeat request (HARQ) acknowledgment message corresponding to the set.

26. The computer program product of claim 25, wherein the non-transitory computer-readable medium further comprises:
instructions for causing a computer to determine a drift in a timing difference between the first subframe and the second subframe; and
instructions for causing a computer to transmit an indication of the drift.

27. The computer program product of claim 26, wherein the instructions for causing a computer to transmit the indication comprise instructions for causing a computer to transmit the indication when the drift is greater than a predetermined threshold.

28. The computer program product of claim 26, wherein the non-transitory computer-readable medium further comprises:
instructions for causing a computer to receive a second indication in response to the indication of the drift, the second indication adapted to associate the first subframe of the first downlink with a third subframe of the second downlink, other than the second subframe of the second downlink.

29. The computer program product of claim 28, wherein the indication comprises an RRC measurement control message comprising an indication of at least one of event 6E, event 6F, or event 6G.

30. The computer program product of claim 25, wherein the indication comprises an RRC measurement control message comprising an indication of at least one of event 6E, event 6F, or event 6G.

31. The computer program product of claim 25, wherein the indication further comprises information relating to a time when the association between the first subframe and the second subframe is to take effect.

32. The computer program product of claim 25, wherein the non-transitory computer-readable medium further comprises:
instructions for causing a computer to receive a third downlink from a third cell; and
instructions for causing a computer to receive a fourth downlink from a fourth cell,
wherein the indication is further adapted to associate a third subframe of the third downlink with a fourth subframe of the fourth downlink to construct the set.

33. A computer program product, comprising:
a non-transitory computer-readable medium comprising:
instructions for causing a computer to receive a first downlink from a first cell;
instructions for causing a computer to receive a second downlink from a second cell;
instructions for causing a computer to determine an association of a first subframe of the first downlink with a second subframe of the second downlink in accordance with a predetermined alignment rule; and
instructions for causing a computer to transmit in a single subframe a hybrid automatic repeat request (HARQ) acknowledgment message comprising information corresponding to the first subframe and the second subframe.

34. The computer program product of claim 33, wherein the non-transitory computer-readable medium further comprises:
instructions for causing a computer to receive an instruction to associate a HARQ acknowledgment message corresponding to the first downlink and the second downlink in accordance with the timing of the first subframe,
wherein the instructions for causing a computer to determine the association comprise instructions for causing a computer to associate the first subframe with the second subframe in accordance with the instruction.

35. A computer program product, comprising:
a non-transitory computer-readable medium comprising:
instructions for causing a computer to transmit to a user equipment (UE) a downlink comprising a first subframe;
instructions for causing a computer to receive from the UE a hybrid automatic repeat request (HARQ) acknowledgment message; and
instructions for causing a computer to receive from a Radio Network Controller (RNC) an indication to associate the HARQ acknowledgment message with the first subframe.

36. A computer program product, comprising:
a non-transitory computer-readable medium comprising:
instructions for causing a computer to transmit to a user equipment (UE) a downlink comprising one or more subframes;

instructions for causing a computer to receive from the UE one or more hybrid automatic repeat request (HARQ) acknowledgment messages corresponding to the one or more subframes; and instructions for causing a computer to receive from a Radio Network Controller (RNC) a timing relationship between the one or more subframes and the one or more corresponding HARQ acknowledgment messages.

37. A processing system comprising:
at least one processor; and
a memory coupled to the at least one processor,
wherein the at least one processor is configured to:
receive a first downlink from a first cell;
receive a second downlink from a second cell;
receive an indication to associate a first subframe of the first downlink with a second subframe of the second downlink to construct a set; and
transmit in a single subframe a hybrid automatic repeat request (HARQ) acknowledgment message corresponding to the set.

38. The processing system of claim 37, wherein the at least one processor is further configured to:
determine a drift in a timing difference between the first subframe and the second subframe; and
transmit an indication of the drift.

39. The processing system of claim 38, wherein the transmitting of the indication comprises transmitting the indication when the drift is greater than a predetermined threshold.

40. The processing system of claim 38, wherein the at least one processor is further configured to:
receive a second indication in response to the indication of the drift, the second indication adapted to associate the first subframe of the first downlink with a third subframe of the second downlink, other than the second subframe of the second downlink.

41. The processing system of claim 40, wherein the indication comprises an RRC measurement control message comprising an indication of at least one of event 6E, event 6F, or event 6G.

42. The processing system of claim 37, wherein the indication comprises an RRC measurement control message comprising an indication of at least one of event 6E, event 6F, or event 6G.

43. The processing system of claim 37, wherein the indication further comprises information relating to a time when the association between the first subframe and the second subframe is to take effect.

44. The processing system of claim 37, wherein the at least one processor is further configured to:
receive a third downlink from a third cell; and
receive a fourth downlink from a fourth cell,
wherein the indication is further adapted to associate a third subframe of the third downlink with a fourth subframe of the fourth downlink to construct the set.

45. A processing system comprising:
at least one processor; and
a memory coupled to the at least one processor,
wherein the at least one processor is configured to:
receive a first downlink from a first cell;
receive a second downlink from a second cell;
determine an association of a first subframe of the first downlink with a second subframe of the second downlink in accordance with a predetermined alignment rule; and
transmit in a single subframe a hybrid automatic repeat request (HARQ) acknowledgment message comprising information corresponding to the first subframe and the second subframe.

46. The processing system of claim 45, wherein the at least one processor is further configured to:
receive an instruction to associate a HARQ acknowledgment message corresponding to the first downlink and the second downlink in accordance with the timing of the first subframe,
wherein the determining of the association comprises associating the first subframe with the second subframe in accordance with the instruction.

47. A processing system comprising:
at least one processor; and
a memory coupled to the at least one processor,
wherein the at least one processor is configured to:
transmit to a user equipment (UE) a downlink comprising a first subframe;
receive from the UE a hybrid automatic repeat request (HARQ) acknowledgment message; and
receive from a Radio Network Controller (RNC) an indication to associate the HARQ acknowledgment message with the first subframe.

48. A processing system comprising:
at least one processor; and
a memory coupled to the at least one processor,
wherein the at least one processor is configured to:
transmit to a user equipment (UE) a downlink comprising one or more subframes;
receive from the UE one or more hybrid automatic repeat request (HARQ) acknowledgment messages corresponding to the one or more subframes; and
receive from a Radio Network Controller (RNC) a timing relationship between the one or more subframes and the one or more corresponding HARQ acknowledgment messages.

* * * * *